United States Patent
Schneider et al.

(10) Patent No.: US 9,787,211 B1
(45) Date of Patent: Oct. 10, 2017

(54) POWER CONVERTER FOR AC MAINS

(71) Applicant: TSi Power Corp., Antigo, WI (US)

(72) Inventors: Robert S Schneider, Middleton, WI (US); Pallab Midya, Palatine, IL (US); Peter Nystrom, Antigo, WI (US)

(73) Assignee: TSi Power Corp., Antigo, WI (US)

( * ) Notice: Subject to any disclaimer, the term of this patent is extended or adjusted under 35 U.S.C. 154(b) by 0 days.

(21) Appl. No.: 15/288,451

(22) Filed: Oct. 7, 2016

(51) Int. Cl.
| | |
|---|---|
| *H02M 3/156* | (2006.01) |
| *H02M 3/158* | (2006.01) |
| *H02M 5/45* | (2006.01) |
| *H02M 5/451* | (2006.01) |
| *H02M 5/44* | (2006.01) |
| *H02M 1/12* | (2006.01) |

(52) U.S. Cl.
CPC .............. *H02M 5/44* (2013.01); *H02M 1/12* (2013.01)

(58) Field of Classification Search
CPC ............ H02M 5/45; H02M 5/40; H02M 5/44; H02M 5/4505; H02M 5/451; H02M 5/458; H02M 1/12; H02M 3/1582; H02M 3/156; H02M 3/158; H02M 3/1584; H02M 2003/1586; H02M 3/1588; H02M 7/217; H02M 7/5387
See application file for complete search history.

(56) References Cited

U.S. PATENT DOCUMENTS

| | | | |
|---|---|---|---|
| 4,845,605 A | 7/1989 | Steigerwald | |
| 6,118,676 A * | 9/2000 | Divan | H02J 3/1814 323/207 |
| 7,684,222 B2 * | 3/2010 | Paatero | H02J 9/062 363/123 |
| 7,920,392 B2 * | 4/2011 | Schneider | H02J 3/1814 307/105 |
| 2008/0013351 A1 | 1/2008 | Alexander | |
| 2008/0049474 A1 * | 2/2008 | Tan | H02M 5/293 363/123 |
| 2008/0284367 A1 | 11/2008 | Kawashima | |

(Continued)

OTHER PUBLICATIONS

Bhaskar P.Prasad, Mucithiar S.Ali, Sai M.Subrahmanyam, Compensation of sag by using transformerless active voltage boost circuit, International Conference on Emerging Trends in Science Technology Engineering and Management Oct. 9-10, 2015.

*Primary Examiner* — Timothy J Dole
*Assistant Examiner* — Sisay G Tiku
(74) *Attorney, Agent, or Firm* — Patents and Licensing LLC; Daniel W. Juffernbruch

(57) ABSTRACT

An AC power converter converts power from an AC power source to an AC load. A DC power holding source is coupled to an input half-bridge switch, a common half-bridge switch and an output half-bridge switch. A controller is coupled to at least two of the input half-bridge switch, the common half-bridge switch, and an output half-bridge switch. The controller switches the input half bridge at the first switching frequency in boost mode and at the line frequency in buck mode. The controller also switches the output half bridge switch at the first switching frequency in buck mode and at the line frequency in boost mode. Input and output low pass filters can eliminate switching frequency energy from entering the AC source and load. The converter maintains a DC power holding source voltage slightly above peak AC input voltage and significantly less than twice the peak AC input voltage.

15 Claims, 18 Drawing Sheets

(56) References Cited

U.S. PATENT DOCUMENTS

| | | | |
|---|---|---|---|
| 2009/0290385 A1* | 11/2009 | Jungreis | H02M 1/4241 363/17 |
| 2012/0236616 A1* | 9/2012 | Zacharias | H02J 3/1842 363/132 |
| 2012/0257429 A1* | 10/2012 | Dong | H02M 3/1582 363/127 |
| 2013/0318366 A1* | 11/2013 | Mao | G05F 3/02 713/300 |
| 2016/0218635 A1* | 7/2016 | Stewart | H02M 5/293 |

* cited by examiner

POWER CONVERTER FOR AC MAINS

BACKGROUND OF THE INVENTION

1. Technical Field

The present inventions relate to a multi-bridge power converter and, more particularly, relate to a multi-bridge power converter for creating an AC mains power supply for large power loads.

2. Description of the Related Art

AC voltage regulation, voltage sag and voltage surge correction are a proven need for today's commercial and industrial utility power grid users. Centralized power generation cannot prevent local brown outs and outages which are best mitigated at the point of use. A variety of solutions employ power converters, energy storage devices and controls to correct for these disturbances. Economic benefits over the related art may be realized by eliminating or reducing the size of magnetic components and semiconductors and increasing energy efficiency.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE DRAWINGS

Figure 1:
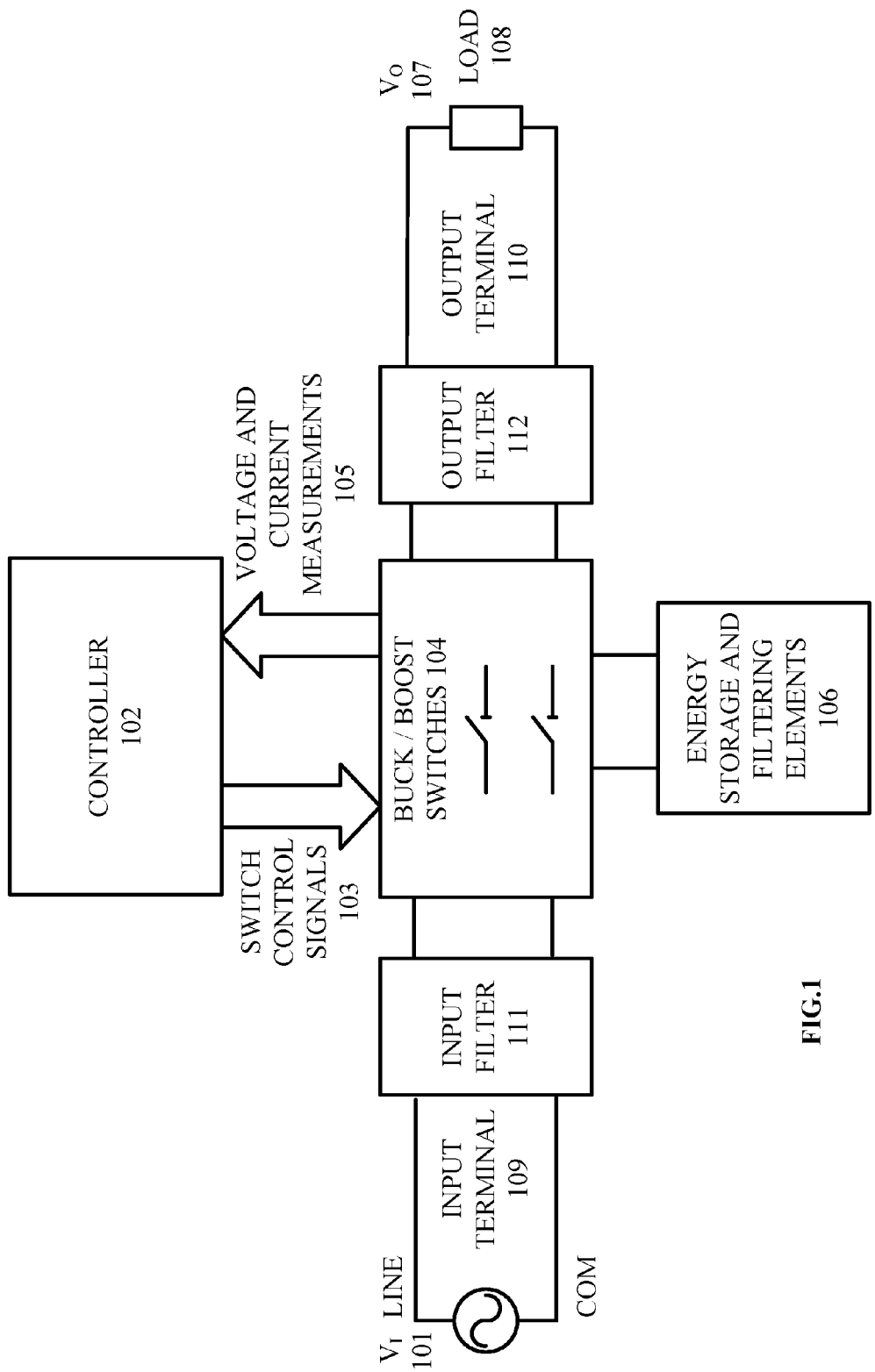
FIG. 1 illustrates a block diagram of the overall system according to embodiments of the present inventions.

FIG. 1 illustrates a block diagram of the overall system with Controller, $V_I$, $V_O$, Switches, Filters including L & C, energy storage elements and load according to embodiments of the present inventions. The AC source 101 ($V_I$) provides line LINE and common COM outputs as illustrated in FIG. 1. The Controller 102 controls the power taken from AC Source $V_I$ 101 to provide desired power to Load 108 according to embodiments of the present inventions. The AC Source $V_I$ 101 powers the Load 108 with varying output using the Controller 102. Controller 102 takes input from buck or boost switches 104 and filters 111, 112 in the form of voltage and current measurements 105 and generates output in the form of switch control signals 103 which control the switches 104. AC Source $V_I$ 101 connects through Input terminal 109 to the Input filter 111 which in turn connects to buck or boost switches 104. Energy storage elements 106 provide a DC holding source and are connected to Switches 104. Switches 104 connect to the Output filter 112. Output voltage $V_O$ 107 is the voltage at the node connecting the Output filter 112 to the Output terminal 110 and the Load 108. By using passive or active devices and novel switching algorithms, the present invention maintains a DC bus voltage at basically half that of the prior art.

The Switches 104 provide an input half-bridge switch, a common half-bridge switch, and an output half-bridge switch. The input half-bridge switch, the common half-bridge switch and the output half-bridge switch are operatively coupled to the DC power holding source. The Energy storage elements 106 are operatively coupled to a DC power holding source and Switches 104.

To maintain regulation of the output voltage $V_O$ and the DC holding source voltage, the Controller 102 is coupled to at least two of the input half-bridge switch, the common half-bridge switch, and the output half-bridge switch to generate up to three control signals at a first switching frequency, a second switching frequency and at AC line frequency. The input half-bridge is switched at a first switching frequency during boost mode, that is, whenever the polarity of the AC source voltage $V_I$ and the polarity of the difference of the output voltage $V_O$ and the AC source voltage $V_I$ are the same. This may be expressed as whenever $[(V_I>0)$ and $(V_O>V_I)]$ or $[(V_I<0)$ and $(V_O<V_I)]$ where $V_O$ and $V_I$ are instantaneous values. During boost mode, the output half-bridge is switched at AC line frequency. Conversely in buck mode, that is, whenever $[(V_I>0)$ and $(V_O<V_I)]$ or $[(V_I<0)$ and $(V_O>V_I)]$ where $V_O$ and $V_I$ are instantaneous values, the output half-bridge switches at a first switching frequency and the input half-bridge switches at AC line frequency. In both buck and boost modes, the controller may produce a second switching frequency to control the common half bridge switch to regulate the DC holding source voltage.

The system includes an input low pass filter 111 and an output low pass filter 112. The input low pass filter is operatively coupled to the input half-bridge switch of switches 104 and the input terminal of the AC Source 109 and has filter characteristics to eliminate switching frequency energy from entering the AC power source $V_I$ 101. The output low pass filter is operatively coupled to the output half-bridge switch of the switches 104 and the output terminal to the load 110 and has filter characteristics to eliminate the common switching frequency energy from entering the AC load 108.

Figure 2:
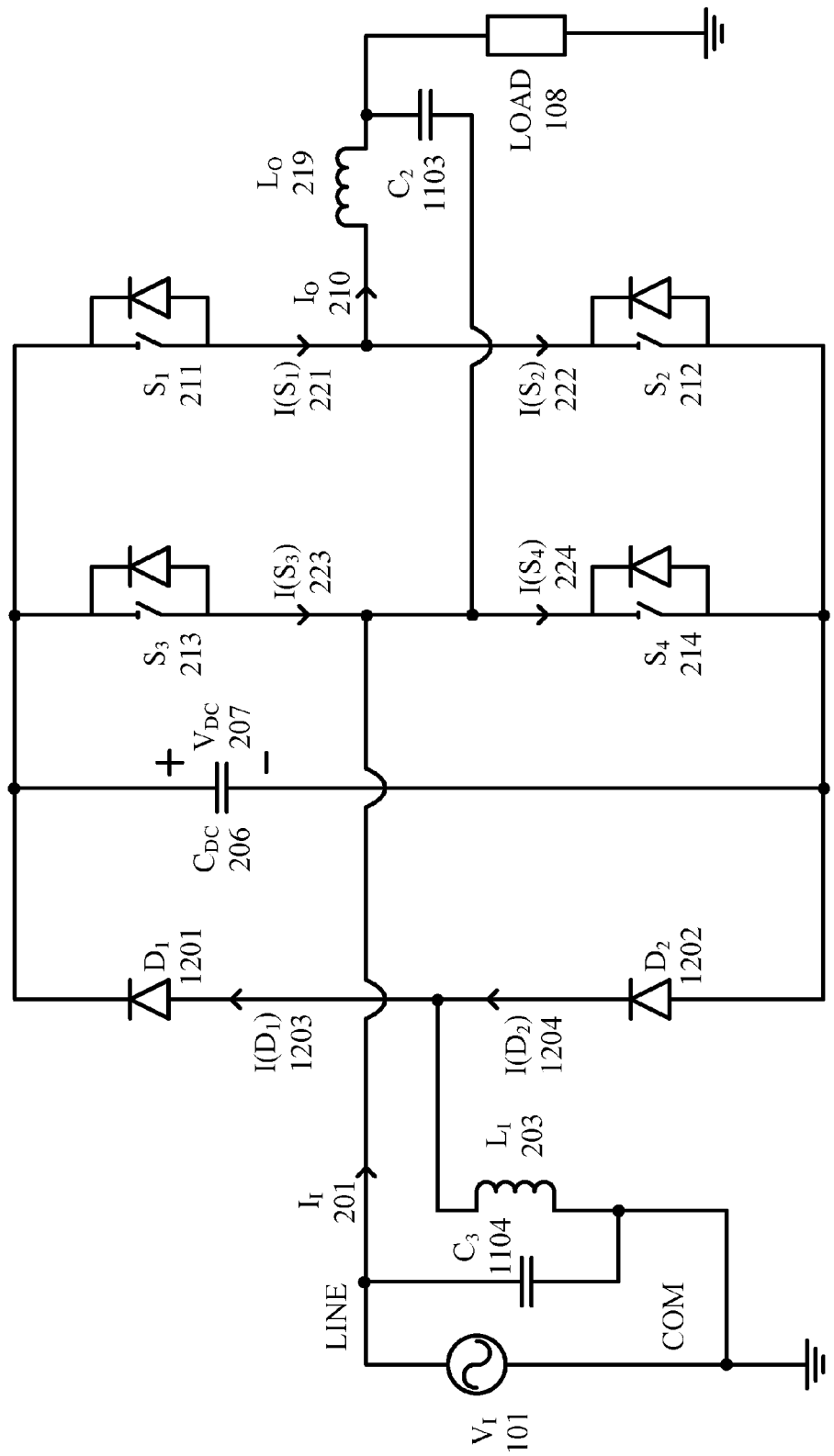
FIG. 2 illustrates a schematic diagram of the system with a passive rectifier front end on a transformerless series regulator circuit according to a first embodiment of the present inventions.

FIG. 2 illustrates a schematic diagram of the system with diodes in the position of the common half-bridge switch according to a first embodiment of the present invention. The AC source 101 ($V_I$) provides line LINE and common COM outputs as illustrated in FIG. 2. The system of FIG. 2 is capable of forward power flow only where AC Source $V_I$ 101 is connected with switches $S_3$ 213 and $S_4$ 214 to the DC holding source $C_{DC}$ 206 (at a voltage of $V_{DC}$ 207) and a passive rectifier comprised of Diodes $D_1$ 1201 & $D_2$ 1202 is also connected to $C_{DC}$ according to the first preferred embodiment. Currents $I(D_1)$ 1203 & $I(D_2)$ 1204 are flowing through Diodes $D_1$ 1201 and $D_2$ 1202.

An input half-bridge switch $S_3$ 213 and $S_4$ 214 is operatively coupled to the DC power holding source 206 and operating at a first switching frequency in boost mode. An output half-bridge switch $S_1$ 211 and $S_2$ 212 is operatively coupled to the DC power holding source 206 and operates at AC line frequency in boost mode. Currents $I(S_1)$ 221 & $I(S_2)$ 222 are flowing through switches $S_1$ 211 and $S_2$ 212. Currents $I(S_3)$ 223 & $I(S_4)$ 224 are flowing through switches $S_3$ 213 and $S_4$ 214.

In the first embodiment of FIG. 2, a common half-bridge switch comprises a pair of diodes 1201, 1202 in parallel with the input half-bridge switch 213, 214 and the output half-bridge switch 211, 212.

An input low pass filter $L_I$ 203, $C_3$ 1104 is operatively coupled to the common half-bridge diodes 1201, 1202 and the input half-bridge switch 213, 214 and has filter characteristics to eliminate the first switching frequency energy from entering the AC source 101. An input terminal is operatively coupled from the input low pass filter to the AC source 109.

An output low pass filter $L_O$ 219, $C_2$ 1103 is operatively coupled to the output half-bridge switch 211, 212 and input half-bridge 213, 214 and has filter characteristics to eliminate the first switching frequency energy from entering the AC load 108. An output terminal is operatively coupled from the output low pass filter to the AC load 108.

In the first embodiment of FIG. 2, the controller 102 generates two control signals: an input half-bridge switch control signal operatively coupled to switch the input half-bridge switch 213, 214 and an output half-bridge switch control signal operatively coupled to switch the output half-bridge switch 211, 212. There is no control signal for the common half-bridge switch formed by the diodes 1201 and 1202. A first switching frequency and an AC line frequency is chosen to cause the switching of the pair of the diodes 1201, 1202 at a line frequency of the AC input 101.

Referring to FIG. 2, circuit operation is as follows. With the AC supply first applied, it is assumed that a suitable soft-charging circuit is implemented to avoid high current inrush into capacitor $C_{DC}$. At this point the DC bus voltage $V_{DC}$ across $C_{DC}$ equals the approximate peak of the AC supply ($V_I \times \sqrt{2}$). However, for the circuit to operate in boost mode, the switching of semiconductors $S_1$-$S_4$ must be performed in a particular way to make rectification possible without creating destructive surge currents in the rectifier circuit. The proper switching may be understood by looking at the various operating modes of the circuit while it is boosting the input. In all cases, the output is assumed to be in phase with the input. There are two distinct operating modes that are synchronized with the polarity of the line voltage. Boost mode 1 is for the positive half cycle ($V_I>0$) and boost mode 2 for the negative half cycle ($V_I<0$). In mode 1, $S_1$ is held on continuously to bias the rectifier properly with respect to the AC supply ($V_1$). In boost mode 2, $S_2$ is held on continuously for the same reason thus resulting in switching at the AC line frequency. The input half-bridge modulates the output voltage by switching $S_3$ and $S_4$ at a first switching frequency.

FIG. 2, Boost Mode 1: $V_I>0$, $S_1$ is on, $S_3$ and $S_4$ are modulating

Boost mode 1a—$S_4$ on, positive current-increasing mode.
Assuming $L_I$ is chosen for continuous conduction, the governing equations for mode 1a ($S_4$ on—positive current-increasing mode) are given below.

$$\text{Current in } L_I: \frac{di_{L_I}}{dt} = \frac{1}{L_I}(V_I)$$

$$\text{Current in } L_O: \frac{di_{L_O}}{dt} = \frac{1}{L_O}(V_I + V_{DC} - V_o)$$

Switching mode 1b, $S_3$ on-positive current-decreasing mode.
Governing equations for mode 1b ($S_3$ on—positive current-decreasing mode):

$$\text{Current in } L_I: \frac{di_{L_I}}{dt} = \frac{1}{L_I}(V_I - V_{DC})$$

$$\text{Current in } L_O: \frac{di_{L_O}}{dt} = \frac{1}{L_O}(V_I - V_o)$$

It can be seen that as long as $V_{DC}>V_I$, current in both inductors can be controlled by modulating $S_3$ and $S_4$. Since the modulation of $S_3$-$S_4$ affects currents in both $L_I$ and $L_O$), an additional condition must be satisfied in order that the circuit to operate in steady state. Over a switching cycle, it may be assumed that the voltages are constants and therefore, the switching times are determined by the following relations:

$T_{sw}$=total switching period, $t_{on}$=$S_4$ on time

Zero volt-seconds across $L_I$: $V_I \times t_{on} = -(V_I - V_{DC}) \times (T_{sw} - t_{on})$  (1)

Zero volt-seconds across $L_O$: $(V_I + V_{DC} - V_O) \times t_{on} = -(V_I - V_O) \times (T_{sw} - t_{on})$  (1)

Or in terms of duty cycles,

Zero volt-seconds across $L_I$: $d = \dfrac{t_{on}}{T_{sw}} = \dfrac{V_{DC} - V_I}{V_{DC}}$  (3)

Zero volt-seconds across $L_O$: $d = \dfrac{t_{on}}{T_{sw}} = \dfrac{V_o - V_I}{V_{DC}}$  (4)

FIG. 2, Boost Mode 2: $V_I$<0, $S_2$ is on, $S_3$ and $S_4$ are modulating.

In Boost Mode 2, the current and voltage are in the opposite direction of mode 1. In this case the equations are modified. FIG. 2, Switching Mode 2a —$S_3$ on, negative current-increasing mode.

Current in $L_I$: $\dfrac{di_{L_I}}{dt} = \dfrac{1}{L_I}(V_I)$

Current in $L_O$: $\dfrac{di_{L_O}}{dt} = \dfrac{1}{L_O}(V_I - V_{DC} - V_o)$

FIG. 2, Boost Mode 2b: $V_I$<0, $S_2$ is on, $S_3$ and $S_4$ are modulating.

Governing equations for Boost Mode 2b ($S_4$ on—negative current-decreasing mode):

Current in $L_I$: $\dfrac{di_{L_I}}{dt} = \dfrac{1}{L_I}(V_I + V_{DC})$

Current in $L_O$: $\dfrac{di_{L_O}}{dt} = \dfrac{1}{L_O}(V_I - V_o)$ $T_{sw}$=total switching period, $t_{on}$=$S_4$ on time Zero volt-seconds across $L_I$: $(V_I + V_{DC}) \times t_{on} = -V_I \times (T_{sw} - t_{on})$ Zero volts-seconds across $L_O$: $(V_I - V_O) \times t_{on} = -(V_I - V_{DC} - V_O) \times (T_{sw} - t_{on})$ Or in terms of duty cycles, Zero volts-seconds across $L_I$: $d = \dfrac{t_{on}}{T_{sw}} = \dfrac{-V_I}{V_{DC}}$ Zero volts-seconds across $L_O$: $d = \dfrac{t_{on}}{T_{sw}} = \dfrac{V_o + V_{DC} - V_S}{V_{DC}}$ FIG. 3-FIG. 6 illustrate operational waveforms based on simulation results. The nominal output of the simulated circuits is 230 VAC with a nominal current of 21.7 Arms (5 kW). The input inductor 203 is 1.0 mHy with the output inductor 219=250 uH. The input filter capacitor 1104 is 10 uF and the output filter capacitor 1103 is 40 uF. The DC bus capacitor 206 is 7200 uF. In all cases, the simulation is run for an input voltage of 115 VAC or 50% of nominal except for the zero ride through simulation where the input voltage is 0 VAC.

Figure 3:
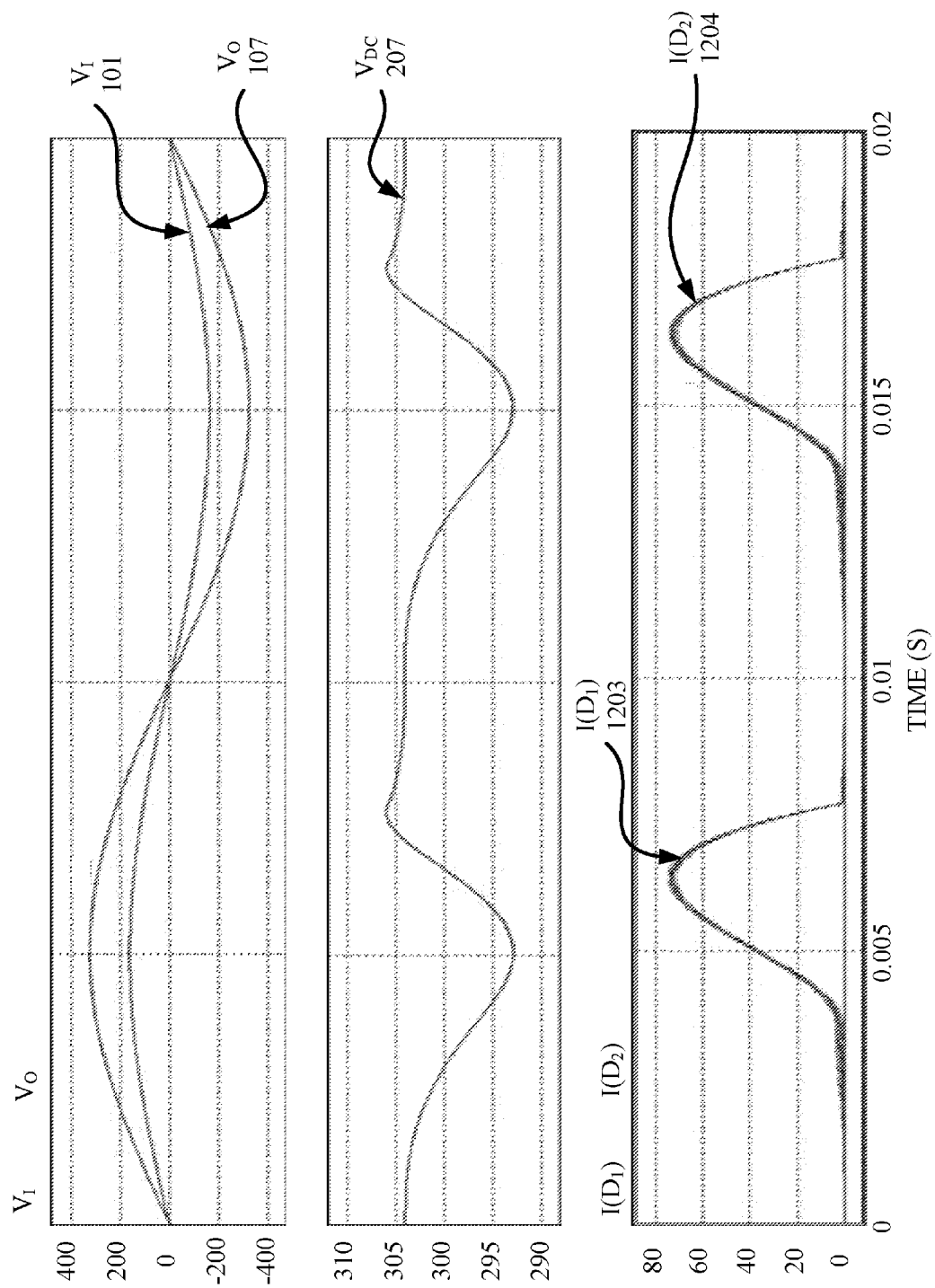
FIG. 3 illustrates simulation results for a passive rectifier front end on a transformerless series regulator circuit according to embodiments of the present inventions.

FIG. 3 shows simulation results of the passive rectifier embodiment of FIG. 1. Top traces are input and output AC voltages $V_I$ 101 and $V_O$ 107, middle waveform is the DC bus voltage $V_{DC}$ 207 and third waveforms are the rectifier currents in each diode I($D_1$) 1203 and I($D_2$) 1204.

Figure 4:
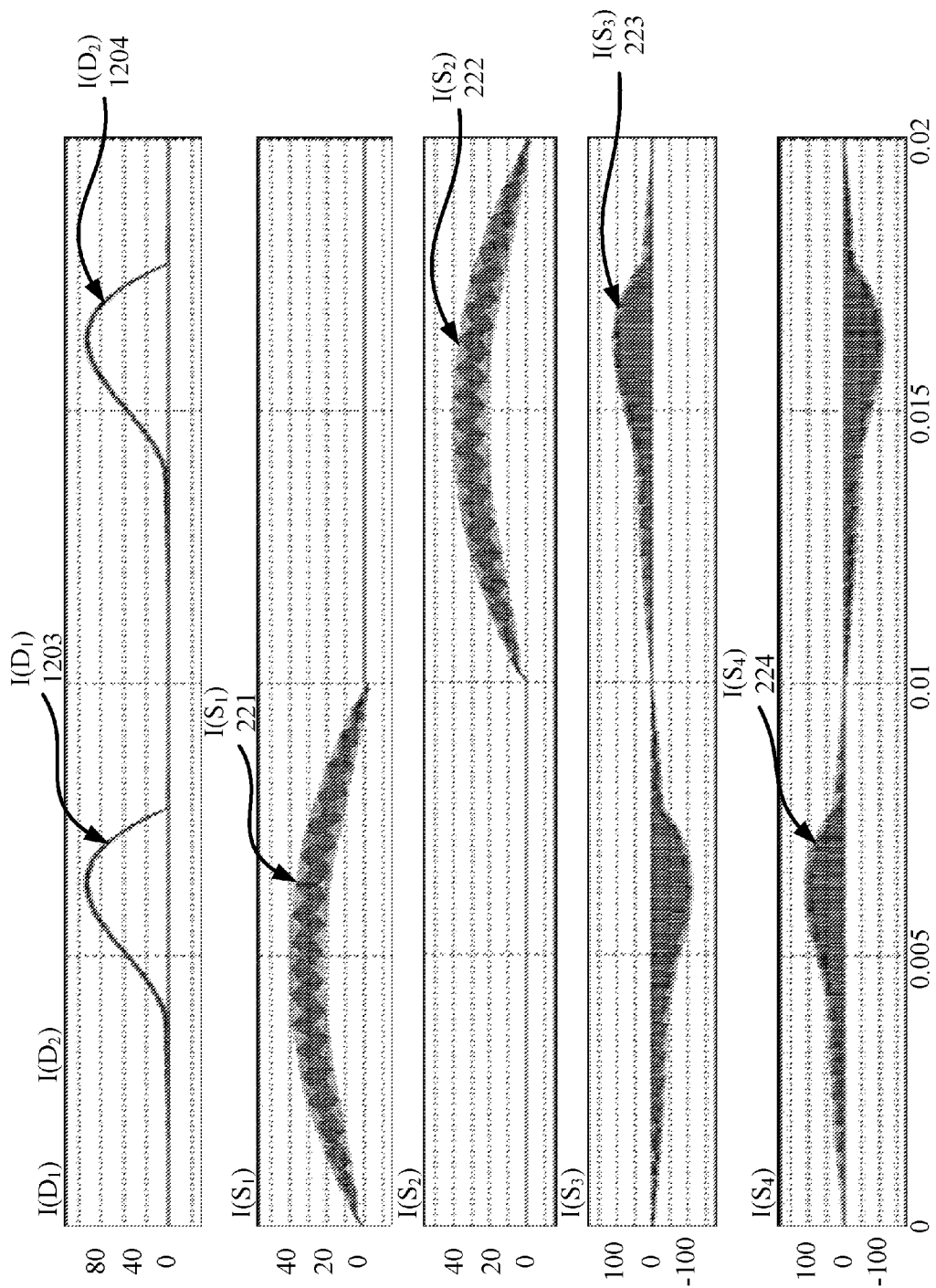
FIG. 4 illustrates simulation results of currents in semiconductor switches for a passive rectifier front end on a transformerless series regulator circuit according to embodiments of the present inventions.

FIG. 4 illustrates simulation results of currents in semiconductor switches for the simulation of the passive rectifier embodiment of FIG. 1 with a 5 kW load. Top plot shows diode currents I($D_1$) 1203 and I($D_2$) 1204. The lower traces plot I($S_1$) 221, I($S_2$) 222, I($S_3$) 223 and I($S_4$) 224. The $D_1$, $D_2$ average current=9.3 A, the $S_1$, $S_2$ average current=10 A and $S_3$, $S_4$ average current=19 A.

Figure 5:
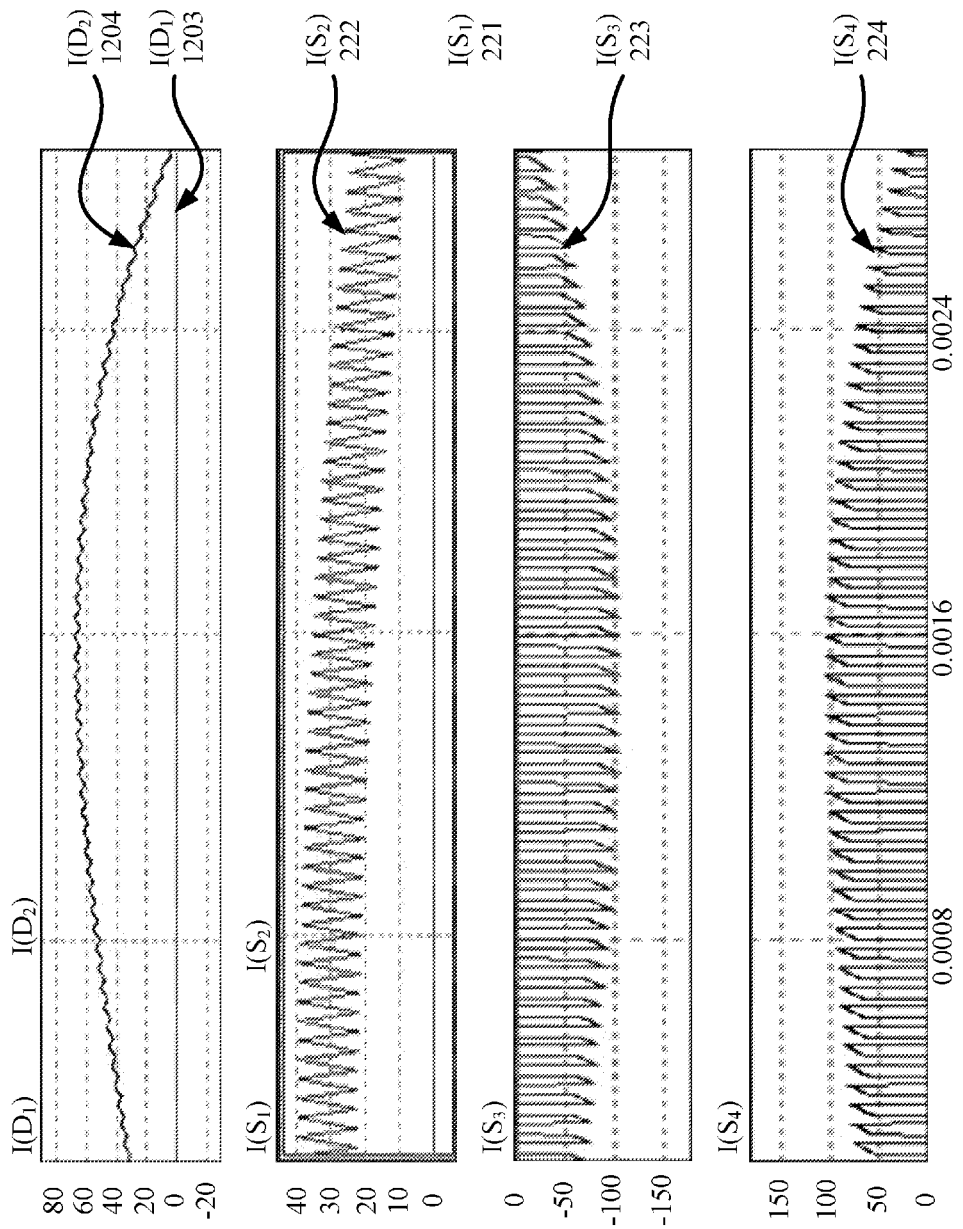
FIG. 5 illustrates a zoomed-in view of simulation results of currents in semiconductor switches for a passive rectifier front end on a transformerless series regulator circuit according to embodiments of the present inventions.

FIG. 5 illustrates simulation results zoomed in on currents in FIG. 4 at a time window about the peak of the rectifier current waveform.

Figure 6:
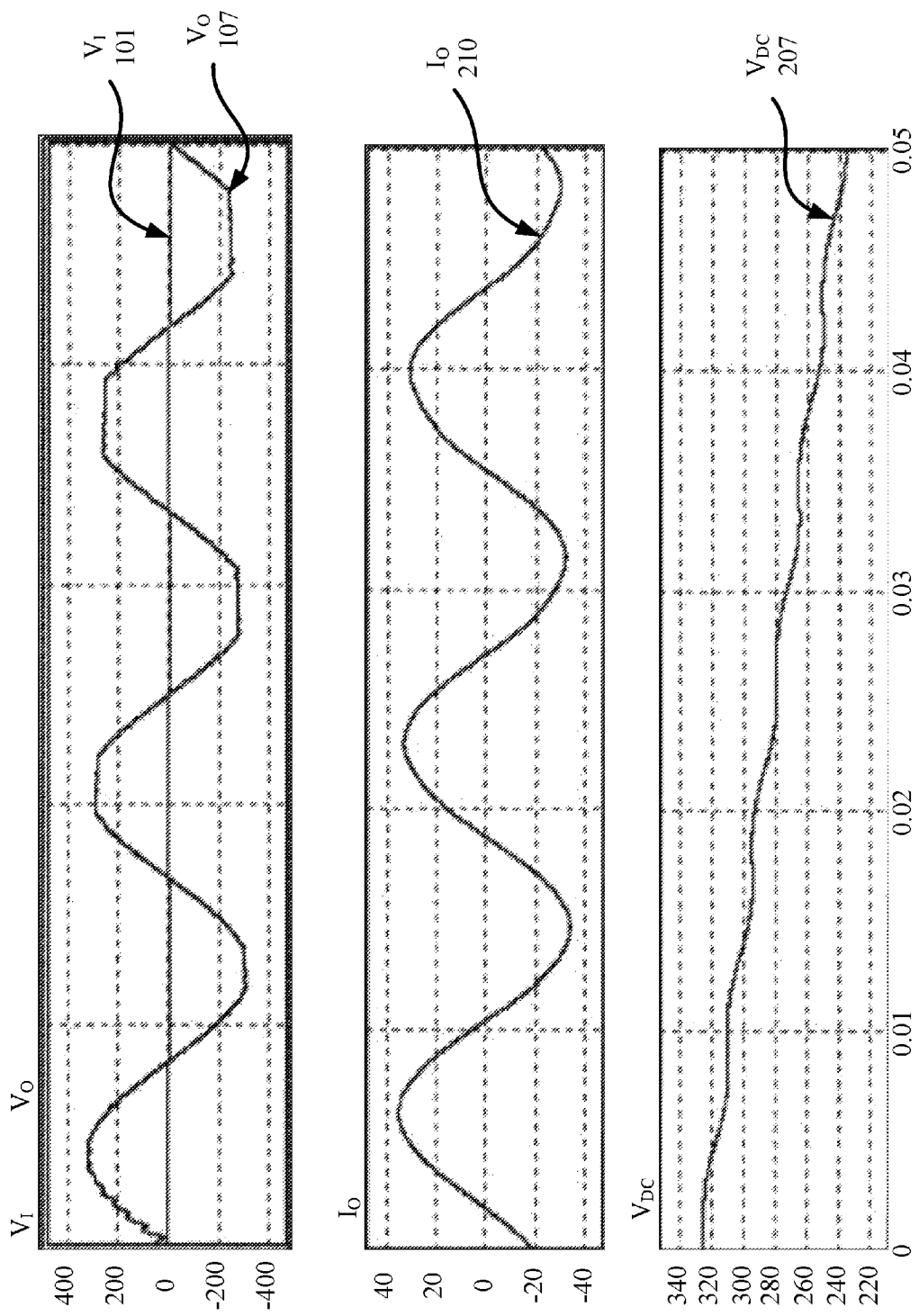
FIG. 6 illustrates a simulation of zero voltage ride through for a passive rectifier front end on a transformerless series regulator circuit according to embodiments of the present inventions.

FIG. 6 illustrates a simulation of zero voltage ride through at 5 kVA (3.5 kW) load. The initial DC holding source voltage is charged to the peak of the rectified nominal input voltage (230V×√2)=approximately 325 Vdc. Top trace is zero-volt input $V_I$ 101 and converter output $V_O$ 107. Middle trace is load current (23.3 Arms). Bottom trace shows DC bus voltage $V_{DC}$ on 7200 uF capacitors. The DC bus is allowed to discharge to approximately 240 Vdc and still maintain a nominal 230V output voltage.

Figure 7:
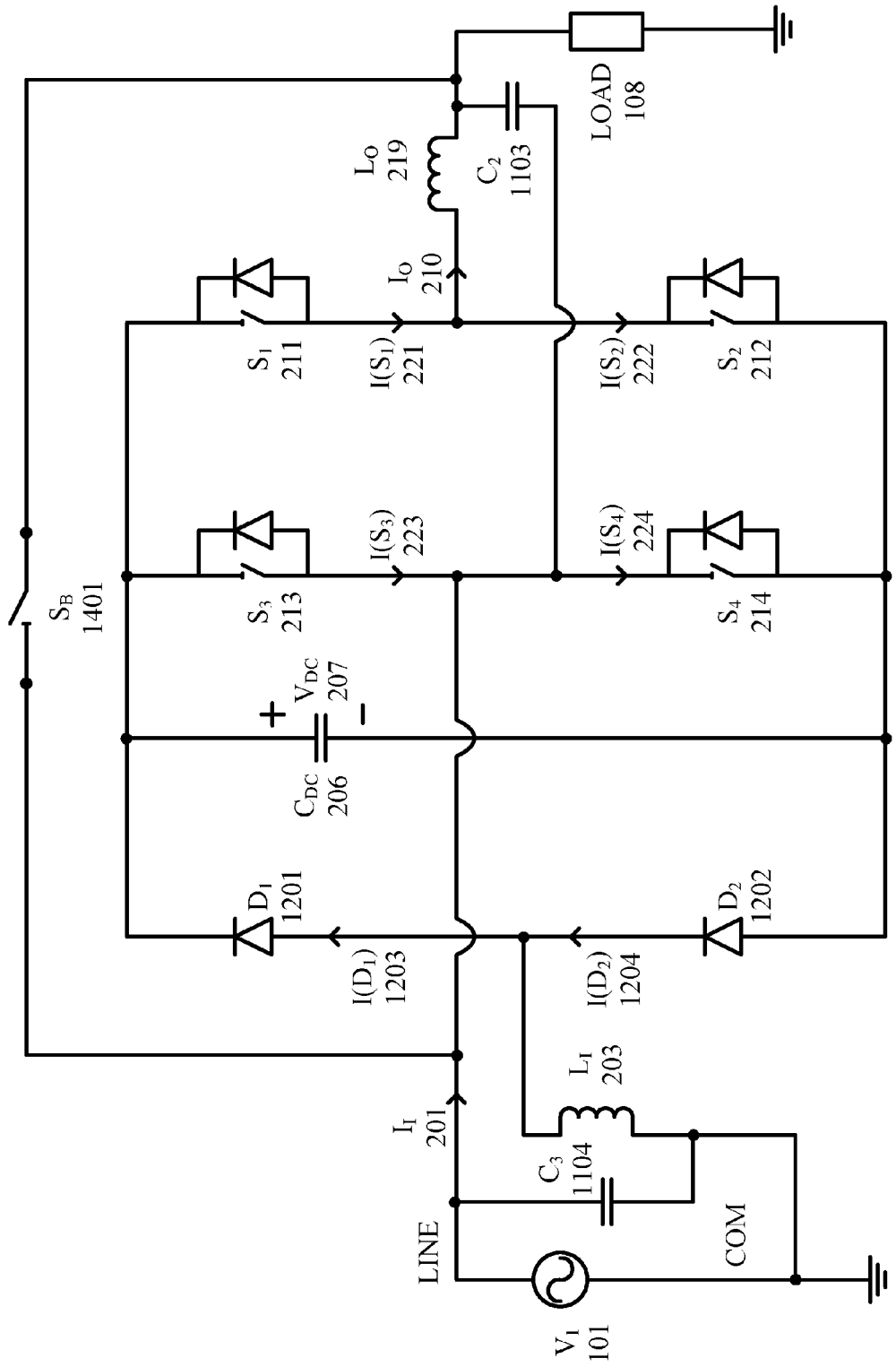
FIG. 7 illustrates a schematic diagram of the system with a bypass switch according to a second embodiment of the present inventions.

FIG. 7 illustrates a schematic diagram of the system according to a second embodiment of the present inventions. The AC source 101 ($V_I$) provides line LINE and common COM outputs as illustrated in FIG. 7. FIG. 7 illustrates a voltage regulator with static bypass switch for standby operation where AC Source $V_I$ 101 is connected with AC bypass switch $S_B$ 1401 to output $V_O$ 107 according to the second embodiment. When the AC Source $V_I$ 101 is nominally close to the desired output voltage the AC bypass switch $S_B$ 1401 is turned on and the remaining switches can all be turned off. The application of AC bypass switch $S_B$ 1401 is not limited to the embodiment illustrated in FIG. 7 but is applicable to any or all embodiments.

Figure 8:
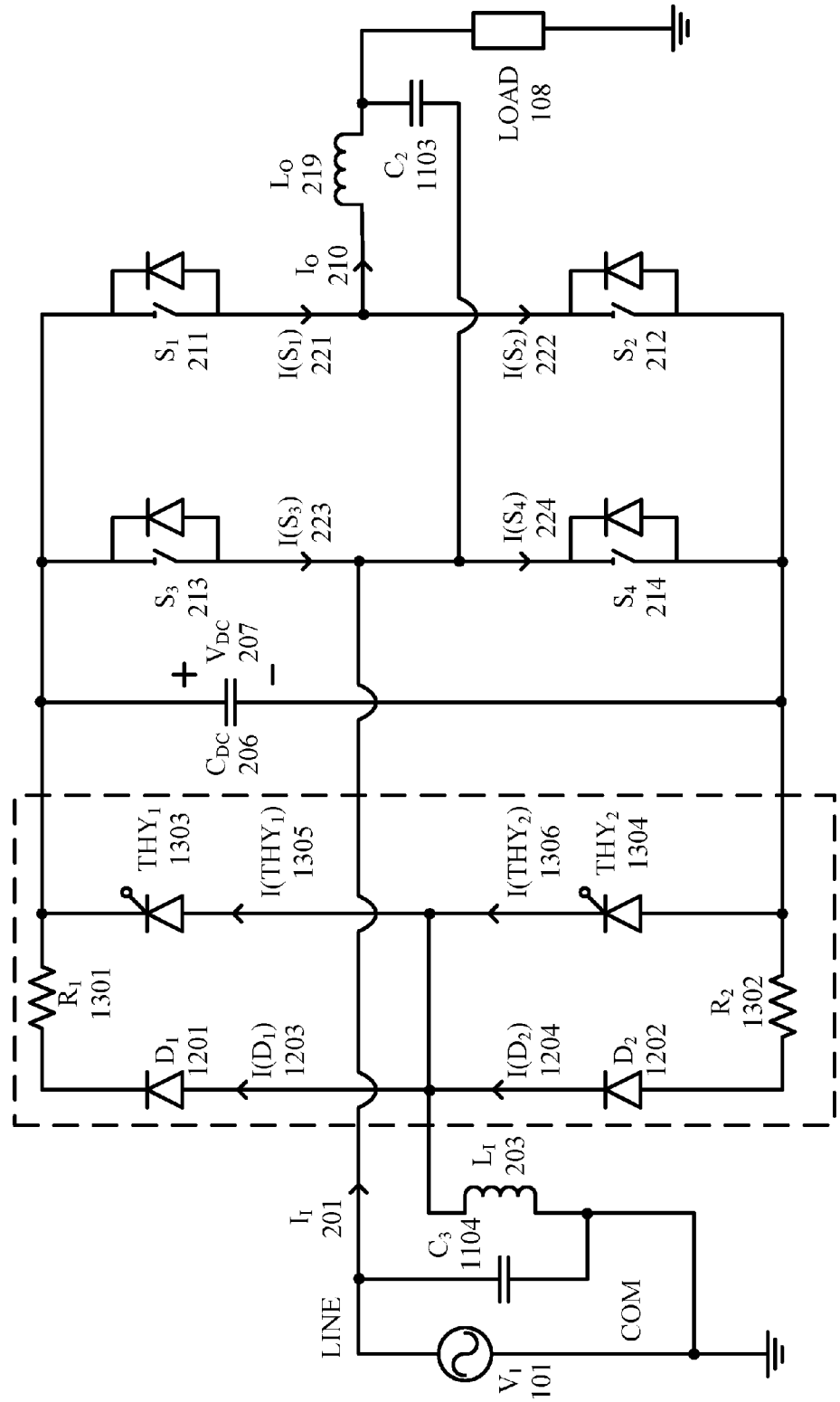
FIG. 8 illustrates a schematic diagram of the system with thyristors according to a third embodiment of the present inventions.

FIG. 8 illustrates a third embodiment of the invention. The AC source 101 ($V_I$) provides line LINE and common COM outputs as illustrated in FIG. 8. Theoretically, the circuit illustrated in FIG. 2 will function down to very low AC input voltage levels; however the currents drawn from the input as well as that which circulates in the circuit components will become impractically large. In a practical implementation, it is desirable to disable the rectifier input and rely on energy storage below some preferable input voltage level. This may be accomplished by using thyristor devices in place of the rectifier diodes. The thyristors are gated on during normal operation and may be turned off when some maximum input current level is reached. At that point, the inverter will continue to operate by drawing energy from the DC holding source $C_{DC}$ 206. With thyristors in the main rectifier path, pre-charge of the $C_{DC}$ may be accomplished by providing diodes with series resistors to limit the inrush current into $C_{DC}$ upon first application of AC power and after deep sags.

FIG. 8 illustrates a schematic diagram of the system according to a third embodiment of the present inventions. FIG. 8 illustrates a schematic diagram of the system showing an alternate rectifier circuit 1305 using thyristors to facilitate selective turn-on and turn-off of AC input rectification. A representative DC bus pre-charge circuit comprised of $D_1$ 1201, $R_1$ 1301, $D_2$ 1202, $R_2$ 1302 is also shown according to the second embodiment. The pre-charge circuit is representative and other pre-charge circuits known to those skilled in the art may be used with this embodiment or any of the other embodiments described.

FIG. 8 illustrates a schematic diagram of the system where AC Source $V_I$ 101 is connected to common at bottom side and to the node between Switches $S_3$ 213 and $S_4$ 214 at the top side. Where $I_I$ 201 is flowing in the direction of Switches. Four Switches, Two Diodes, Two Resistors and Two Thyristors are mutually connected to each other in horizontal & vertical modes which are divided in the vertical section. A first vertical section includes Switches $S_1$ 211 & $S_2$ 212; a second vertical section includes Switches $S_3$ 213 & $S_4$ 214, and a third vertical section includes Capacitor $C_{DC}$ 206 with $V_{DC}$ 207. A fourth vertical section includes Thyristors $THY_1$ 1303 & $THY_2$ 1304 and a fifth vertical section includes Diodes $D_1$ 1201 & $D_2$ 1202, $R_1$ 1301 & $R_2$ 1302. Input inductor $L_I$ 202 is connected to common at bottom side and the top side is connected between Thyristors $THY_1$ 1303 & $THY_2$ 1304 and Diodes $D_1$ 1201 & $D_2$ 1202. Output Inductor $L_O$ 219 is connected between two switches $S_1$ 211 & $S_2$ 212 and other side is connected to Load 108 & $C_2$ 1103 with Voltage $V_O$ 107. Currents $I(S_1)$ 221 & $I(S_2)$ 222 are flowing in the direction of switch $S_2$ 212 from switch $S_1$ 211. Also, Currents $I(S_3)$ 223 & $I(S_4)$ 224 are flowing in the direction of switch $S_4$ 214 from switch $S_3$ 213. Currents $I(D_1)$ 1203 & $I(D_2)$ 1204 are flowing between Diodes $D_1$ 1201 & $D_2$ 1202. Currents $I(THY_1)$ 1305 & $I(THY_2)$ 1306 are flowing between Thyristors $THY_1$ 1303 & $THY_2$ 1304.

An input low pass filter $L_I$ 203, $C_3$ 1104 is operatively coupled to the common half-bridge thyristors 1303, 1304 and the input half-bridge switch 213, 214 and has filter characteristics to eliminate the first switching frequency energy from entering the AC source 101. An input terminal is operatively coupled from the input low pass filter to the AC source 109.

In the third embodiment of FIG. 8, the controller 102 generates three control signals: an input half-bridge switch control signal operatively coupled to switch the input half-bridge switch 213, 214, an output half-bridge switch control signal operatively coupled to switch the output half-bridge switch 211, 212 and a thyristor rectifier control signal operatively coupled to switch the thyristors 1303, 1304. There is no control signal for the common half-bridge switch formed by the diodes 1201 and 1202. A particular switching function of the three control signals is chosen to cause the switching of the pair of the thyristors 1203, 1204 at a line frequency of the AC source 101.

Figure 9:
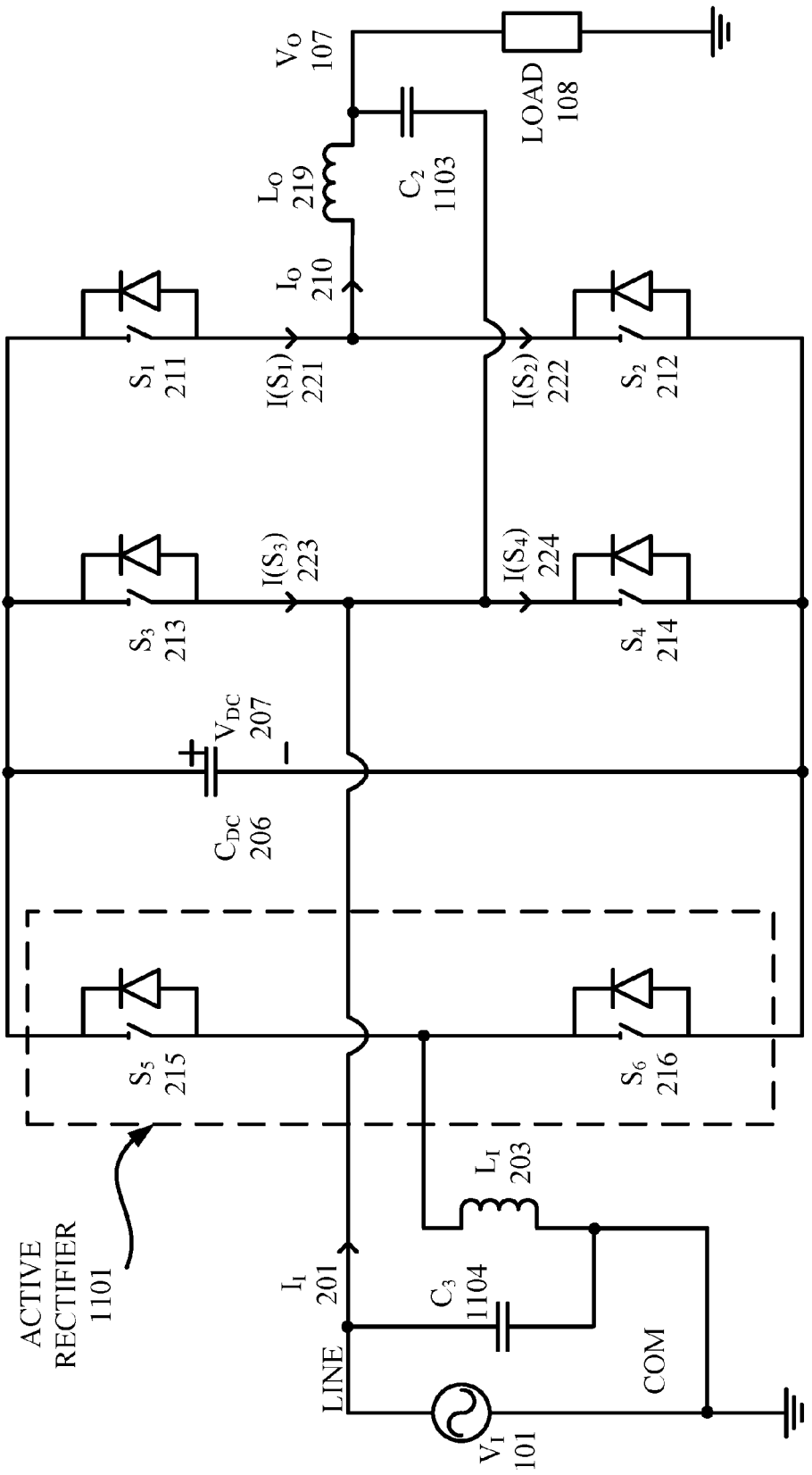
FIG. 9 illustrates a schematic diagram of the system with an active rectifier front end according to a fourth embodiment of the present inventions.

FIG. 9 illustrates a schematic diagram of the system with an active rectifier 1101 in the position of the common half-bridge switch according to a fourth embodiment of the present invention. The system of FIG. 9 is capable of forward and reverse power flow and AC boost and buck operation. AC Source $V_1$ 101 is connected with switches $S_3$ 213 and $S_4$ 214 to the DC holding source $C_{DC}$ 206 (at a voltage of $V_{DC}$ 207) and an active rectifier half-bridge 1101 comprised of switches $S_5$ 215 & $S_6$ 216 is also connected to $C_{DC}$ according to the fourth preferred embodiment.

An input half-bridge switch $S_3$ 213 and $S_4$ 214 is operatively coupled to the DC power holding source 206 and operates at a first switching frequency in boost mode and at AC line frequency in buck mode. An output half-bridge switch $S_1$ 211 and $S_2$ 212 is operatively coupled to the DC power holding source 206 and operates at AC line frequency in boost mode and a first switching frequency in buck mode. A common half-bridge switch 215, 216 is operatively coupled to the DC holding source 206 and operates at a second switching frequency in boost and buck mode.

In the fourth embodiment of FIG. 9, a common half-bridge switch comprises a pair of switches $S_5$ 215 & $S_6$ 216 in parallel with the input half-bridge switch 213, 214, the output half-bridge switch 211, 212 and the DC power holding source 206. The AC source 101 ($V_I$) provides line (LINE) and common COM outputs as illustrated in FIG. 9.

An input low pass filter $L_I$ 203, $C_3$ 1104 is operatively coupled to the common half-bridge switch 215, 216 and the input half-bridge switch 213, 214 and has filter characteristics to eliminate the first switching frequency energy and the second switching frequency energy from entering the AC source 101. An input terminal 109 is operatively coupled from the input low pass filter 111 to the AC source 101.

An output low pass filter $L_O$ 219, $C_2$ 1103 is operatively coupled to the output half-bridge switch 211, 212 and input half-bridge 213, 214 and has filter characteristics to eliminate the first switching frequency energy and the second switching frequency from entering the AC load 108. An output terminal 110 is operatively coupled from the output low pass filter 112 to the AC load 108.

In the fourth embodiment of FIG. 9, the controller 102 generates three control signals: an input half-bridge switch control signal operatively coupled to switch the input half-bridge switch 213, 214, an output half-bridge switch control signal operatively coupled to switch the output half-bridge switch 211, 212 and a common half-bridge switch control signal operatively coupled to switch the common half-bridge switch 215, 216.

In the embodiment illustrated in FIG. 9, the basic function of $S_5$ 215 and $S_6$ 216 is to control magnitude, waveform shape and phase of the current in $L_I$ 203. This current in relation to input voltage $V_I$ 101 determines the power flow into or out of $V_I$. In the most general sense, the shape of current in $L_I$ may be determined by a fundamental component that is used for real power flow. Power flow control is the main purpose of the active rectifier. However, additional functions that may provide product benefits include adding harmonic cancelling terms to the controlled current to cancel load harmonics drawn through the regulator or phase shift components to provide VAR compensation to the AC input circuit. Power flow may be determined by using the magnitude and phase of the current in input inductor $L_I$ 203 to control the DC bus voltage $V_{DC}$ 207. Thus, for a varying AC input voltage $V_I$, the DC bus voltage may be regulated to be approximately constant. Since the active rectifier provides boost capability, the DC bus is preferably regulated above the peak of the highest designed AC input voltage. For example, if a 230 VAC nominal device is to regulate to +20% (276 VAC) then the DC bus may be regulated to greater than 276*$\sqrt{2}$=approximately 390 Vdc.

As with the passive rectifier embodiment in FIG. 2, the semiconductor switches in the active rectifier embodiment of FIG. 9 must be switched in a particular way to avoid states that cause uncontrolled currents in the filter inductors $L_I$ and $L_O$. In all cases, the DC bus voltage is assumed to be greater than the peak of the highest anticipated AC input or AC output voltage. There are four basic combinations of input voltage ($V_I$) and inverter voltage ($V_{INV}$) where ($V_{INV}=V_O-V_I$) that describe all possible operating modes of the transformerless AC voltage regulator. These are defined below:

Boost Mode: $[(V_I>0)$ and $(V_O>V_I)]$ or $[(V_I<0)$ and $(V_O<V_I)]$
Buck Mode: $[(V_I<0)$ and $(V_O>V_I)]$ or $[(V_I>0)$ and $(V_O<V_I)]$ Note: in the general case, $V_I$ and $V_O$ are instantaneous values and do not need to be phase synchronized i.e., zero crossings need not occur at the same time. The above modes cover all phase shift conditions. Since $(V_{INV}>0)$ is equivalent to ($V_O > V_I$) and ($V_{INV} < 0$) is equivalent to ($V_O < V_I$), the relations with $V_{INV}$ will be referenced interchangeably below:

FIG. 9 Boost Mode 1: $V_I > 0$, $V_{INV} > 0$.

For this converter, $L_I$ will always be in continuous conduction, the governing equations for mode 1 are given below.

Current in $L_I$: $\dfrac{di_{L_I}}{dt} = \dfrac{1}{L_I}(V_I + V_{DC})$

Current in $L_O$: $\dfrac{di_{L_O}}{dt} = \dfrac{1}{L_O}(V_I + V_{DC} - V_o)$

To simplify the following description, the differential equations (forcing functions) for all valid combinations of switch positions are summarized in tables. Tables 1-4 below show the eight allowable semiconductor switch combinations that are necessary and sufficient to control both the input and output currents in the transformerless voltage regulator illustrated in this fourth embodiment. The voltage forcing functions are shown for each combination of switches and the resulting polarity of the inductor voltages. These functions are derived in the same manner as shown in first embodiment (FIG. 2). The table will show that for any of the input/output conditions, modulating the switches makes it is possible to apply positive or negative voltage across the input and output inductors to shape current in any desired way. In all cases the DC bus voltage is assumed to be greater than the peak of the highest expected AC input or AC output voltage. Since the DC bus voltage can be boosted and regulated by the active rectifier, this assumption will always hold true.

For example, to interpret Table 1, the AC input/output voltage conditions are given. $V_I > 0$ and $V_{INV} > 0$. Semiconductor $S_1$ is held on steady for the duration of this mode. Switches $S_3$ 213 and $S_4$ 214 are modulated to control the polarity of voltage across $L_O$ and switches $S_5$ and $S_6$ are modulated to control the polarity of voltage across $L_I$ 203.

There seems to be ambiguity about the polarity of the $L_I$ voltage when switch $S_6$ 216 is selected. In this case, the polarity is dependent also on the state of switches $S_3$ 213 and $S_4$ 214. This dependency may appear troublesome at first; however because of the duty cycle of $S_3$-$S_4$'s modulation, it can be shown that choosing switch $S_6$ 216 will result in a net negative voltage applied to the inductor. Assume switch $S_6$ is held on by the control to apply a negative $L_I$ voltage. Under typical operating conditions, the duty cycle of $S_3$ and $S_4$ is $\sin(\omega t)$ as the inverter produces positive voltage $V_I$ $\sin(\omega t)$. The average value of this voltage is $2V_I\sqrt{2}/\pi$. The value of the negative applied voltage is $(2V_I\sqrt{2}/\pi - V_{DC})$. For the net voltage to be negative, $V_{DC}$ must be greater than $2V_I\sqrt{2}/\pi$. For example, if $V_I=230$ Vrms, $V_{DC}>207$ Vdc. This will easily be the case since VDC will be at least $V_I\sqrt{2}$, i.e., 325 Vdc minimum. Simulation results have confirmed controlling the input current under the conditions of Table 1 or Table 2. Conditions in Tables 3 and 4 do not have this ambiguity.

TABLE 1

$V_I > 0$, $V_{INV} > 0$, $S_1$ ON, $S_3$-$S_4$ modulate $V_{INV}$ and $S_5$-$S_6$ modulate $V_{LI}$

| Allowed Semiconductor Switch Combinations | | | Voltage Across $L_I$ $V_{L_I} = L_I \dfrac{di_{L_I}}{dt}$ | Polarity Of $V_{LI}$ When $V_I > 0$ | Polarity Of $V_{LI}$ When $V_I < 0$ | Voltage Across $L_O$ $V_{L_O} = L_O \dfrac{di_{L_O}}{dt}$ | Polarity of $V_{LO}$ when $V_{INV} > 0$ | Polarity of $V_{LO}$ when $V_{INV} < 0$ |
|---|---|---|---|---|---|---|---|---|
| 1 | 4 | 5 | $V_I + V_{DC}$ | + | + | $V_{DC} - V_{INV}$ | + | + |
| 1 | 4 | 6 | $V_I$ | + | − | $V_{DC} - V_{INV}$ | + | + |
| 1 | 3 | 5 | $V_I$ | + | − | $-V_{INV}$ | − | + |
| 1 | 3 | 6 | $V_I - V_{DC}$ | − | − | $-V_{INV}$ | − | + |
| 2 | 3 | 6 | $V_I - V_{DC}$ | − | − | $-V_{DC} - V_{INV}$ | − | − |
| 2 | 3 | 5 | $V_I$ | + | − | $-V_{DC} - V_{INV}$ | − | − |
| 2 | 4 | 6 | $V_I$ | + | − | $-V_{INV}$ | − | + |
| 2 | 4 | 5 | $V_I + V_{DC}$ | + | + | $-V_{INV}$ | − | + |

TABLE 2

$V_I < 0$, $V_{INV} < 0$, $S_2$ ON, $S_3$-$S_4$ modulate $V_{INV}$ and $S_5$-$S_6$ modulate $V_{LI}$

| Allowed Semiconductor Switch Combinations | | | Voltage Across $L_I$ $V_{L_I} = L_I \dfrac{di_{L_I}}{dt}$ | Polarity Of $V_{LI}$ When $V_I > 0$ | Polarity Of $V_{LI}$ When $V_I < 0$ | Voltage Across $L_O$ $V_{L_O} = L_O \dfrac{di_{L_O}}{dt}$ | Polarity of $V_{LO}$ when $V_{INV} > 0$ | Polarity of $V_{LO}$ when $V_{INV} < 0$ |
|---|---|---|---|---|---|---|---|---|
| 1 | 4 | 5 | $V_I + V_{DC}$ | + | + | $V_{DC} - V_{INV}$ | + | + |
| 1 | 4 | 6 | $V_I$ | + | − | $V_{DC} - V_{INV}$ | + | + |
| 1 | 3 | 5 | $V_I$ | + | − | $-V_{INV}$ | − | + |
| 1 | 3 | 6 | $V_I - V_{DC}$ | − | − | $-V_{INV}$ | − | + |
| 2 | 3 | 6 | $V_I - V_{DC}$ | − | − | $-V_{DC} - V_{INV}$ | − | − |
| 2 | 3 | 5 | $V_I$ | + | − | $-V_{DC} - V_{INV}$ | − | − |
| 2 | 4 | 6 | $V_I$ | + | − | $-V_{INV}$ | − | + |
| 2 | 4 | 5 | $V_I + V_{DC}$ | + | + | $-V_{INV}$ | − | + |

TABLE 3

$V_I > 0$, $V_{INV} < 0$, $S_3$ ON, $S_1$-$S_2$ modulate $V_{INV}$ and $S_5$-$S_6$ modulate $V_{LI}$

| Allowed Semiconductor Switch Combinations | | | Forcing functions for controlling Input Current through $L_I$ | | | Forcing functions for controlling Input Current through $L_O$ | | |
|---|---|---|---|---|---|---|---|---|
| | | | Voltage Across $L_I$ $V_{L_I} = L_I \frac{di_{L_I}}{dt}$ | Polarity Of $V_{LI}$ When $V_I > 0$ | Polarity Of $V_{LI}$ When $V_I < 0$ | Voltage Across $L_O$ $V_{L_O} = L_O \frac{di_{L_O}}{dt}$ | Polarity of $V_{LO}$ when $V_{INV} > 0$ | Polarity of $V_{LO}$ when $V_{INV} < 0$ |
| 1 | 4 | 5 | $V_I + V_{DC}$ | + | + | $V_{DC} - V_{INV}$ | + | + |
| 1 | 4 | 6 | $V_I$ | + | − | $V_{DC} - V_{INV}$ | + | + |
| 1 | 3 | 5 | $V_I$ | + | − | $-V_{INV}$ | − | + |
| 1 | 3 | 6 | $V_I - V_{DC}$ | − | − | $-V_{INV}$ | − | + |
| 2 | 3 | 6 | $V_I - V_{DC}$ | − | − | $-V_{DC} - V_{INV}$ | − | − |
| 2 | 3 | 5 | $V_I$ | + | − | $-V_{DC} - V_{INV}$ | − | − |
| 2 | 4 | 6 | $V_I$ | + | − | $-V_{INV}$ | − | + |
| 2 | 4 | 5 | $V_I + V_{DC}$ | + | + | $-V_{INV}$ | − | + |

TABLE 4

$V_I < 0$, $V_{INV} > 0$, $S_4$ ON, $S_1$-$S_2$ modulate $V_{INV}$ and $S_5$-$S_6$ modulate $V_{LI}$

| Allowed Semiconductor Switch Combinations | | | Forcing functions for controlling Input Current through $L_I$ | | | Forcing functions for controlling Input Current through $L_O$ | | |
|---|---|---|---|---|---|---|---|---|
| | | | Voltage Across $L_I$ $V_{L_I} = L_I \frac{di_{L_I}}{dt}$ | Polarity Of $V_{LI}$ When $V_I > 0$ | Polarity Of $V_{LI}$ When $V_I < 0$ | Voltage Across $L_O$ $V_{L_O} = L_O \frac{di_{L_O}}{dt}$ | Polarity of $V_{LO}$ when $V_{INV} > 0$ | Polarity of $V_{LO}$ when $V_{INV} < 0$ |
| 1 | 4 | 5 | $V_I + V_{DC}$ | + | + | $V_{DC} - V_{INV}$ | + | + |
| 1 | 4 | 6 | $V_I$ | + | − | $V_{DC} - V_{INV}$ | + | + |
| 1 | 3 | 5 | $V_I$ | + | − | $-V_{INV}$ | − | + |
| 1 | 3 | 6 | $V_I - V_{DC}$ | − | − | $-V_{INV}$ | − | + |
| 2 | 3 | 6 | $V_I - V_{DC}$ | − | − | $-V_{DC} - V_{INV}$ | − | − |
| 2 | 3 | 5 | $V_I$ | + | − | $-V_{DC} - V_{INV}$ | − | − |
| 2 | 4 | 6 | $V_I$ | + | − | $-V_{INV}$ | − | + |
| 2 | 4 | 5 | $V_I + V_{DC}$ | + | + | $-V_{INV}$ | − | + |

There is an additional operation mode of the 6-switch converter embodiment illustrated in FIG. 9 that opens its usage to a much wider range of applications. There are some circumstances where the AC input may become an open circuit under certain types of faults. These applications include but are not limited to open transition switching by automatic transfer switches. The following describes how the 6-switch topology can be dynamically used to handle this condition.

When an open circuit is presented to the input, the converter may create a return path to common through $S_5$ 215 and $S_6$ 216. To accomplish this, the controller needs to provide $S_5$ 215 with $S_3$'s 213 switching signal and $S_6$ 216 with $S_4$'s 214 switching signal. $S_3$ and $S_5$ now switch synchronously as do $S_4$ and $S_6$. This provides a return path for fundamental current through input inductor $L_I$ 203 and a low impedance path through $C_3$ 1104 for the higher frequency load components. The DC bus capacitance $C_{DC}$ 206 provides the energy required to supply the load.

Figure 18:
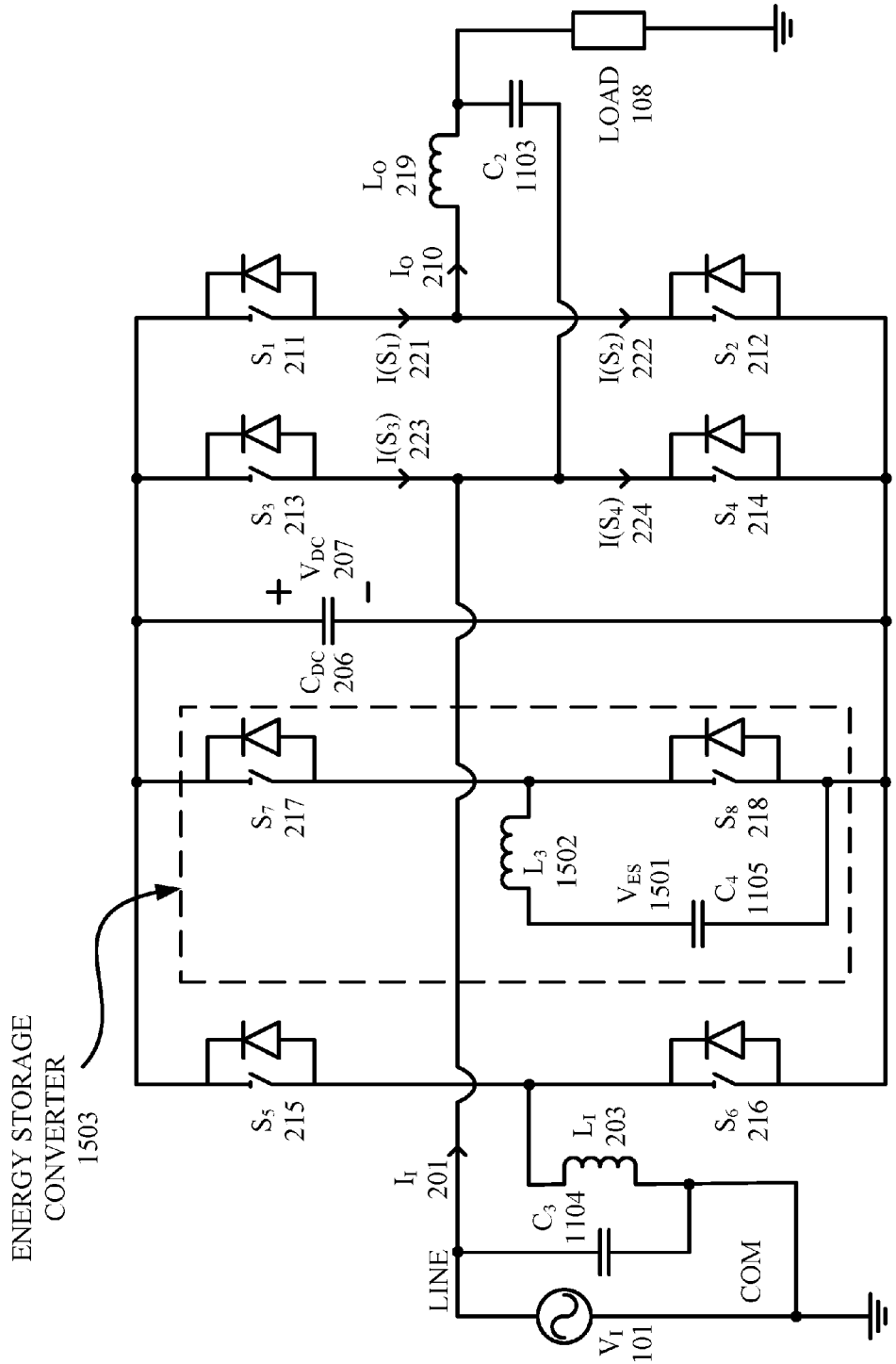
FIG. 18 illustrates a schematic diagram of the system with an energy storage converter according to a sixth embodiment of the present inventions.

This operating feature gives the embodiments illustrated in FIG. 9 and FIG. 18 the advantage of being able to use energy from the input voltage during a closed circuit sag or to operate as an independent voltage source exclusively using the stored energy in the DC holding source for open circuit input conditions.

FIGS. 10-17 illustrate operational waveforms based on simulation results of the FIG. 9 embodiment. The nominal output of the simulated circuits is 230 VAC with a nominal current of 21.7 Arms (5 kW). The input inductor 203 is 1.0 mHy with the output inductor 219=250 uH. The input filter capacitor 1104 is 10 uF and the output filter capacitor 1103 is 40 uF. The DC bus capacitor 206 is 7200 uF. In all cases, the simulation is run for an input voltage of 115 VAC or 50% of nominal.

Figure 10:
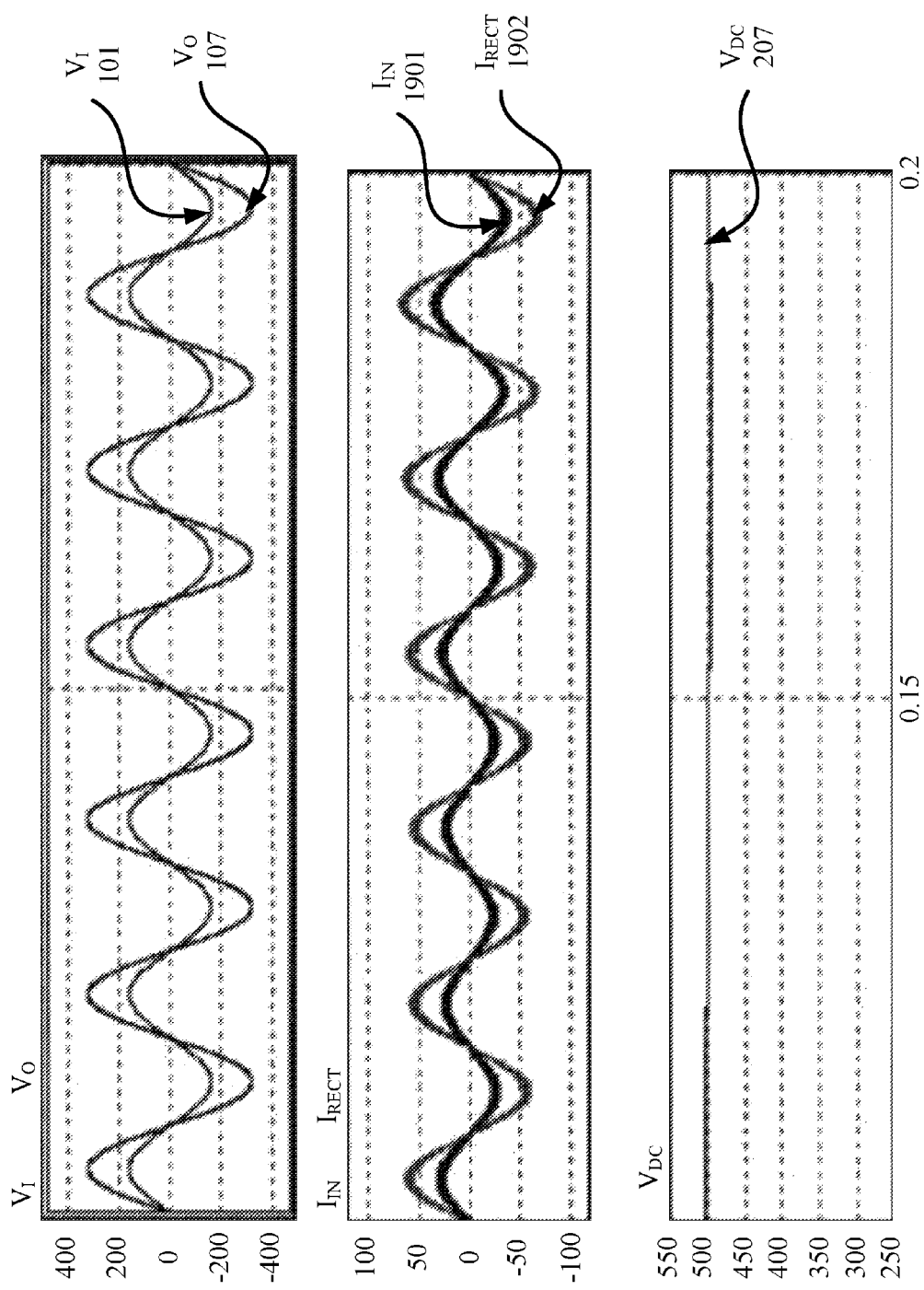
FIG. 10 illustrates a simulation result in boost mode, 50% AC input, resistive load for an active rectifier front end on a transformerless series regulator circuit according to embodiments of the present inventions.

FIG. 10 illustrates simulation results for the embodiment of FIG. 9 in boost mode, 50% AC input with resistive load. Upper plot shows input and output voltage, middle plot shows input current and rectifier current, bottom plot shows regulated DC bus.

Figure 11:
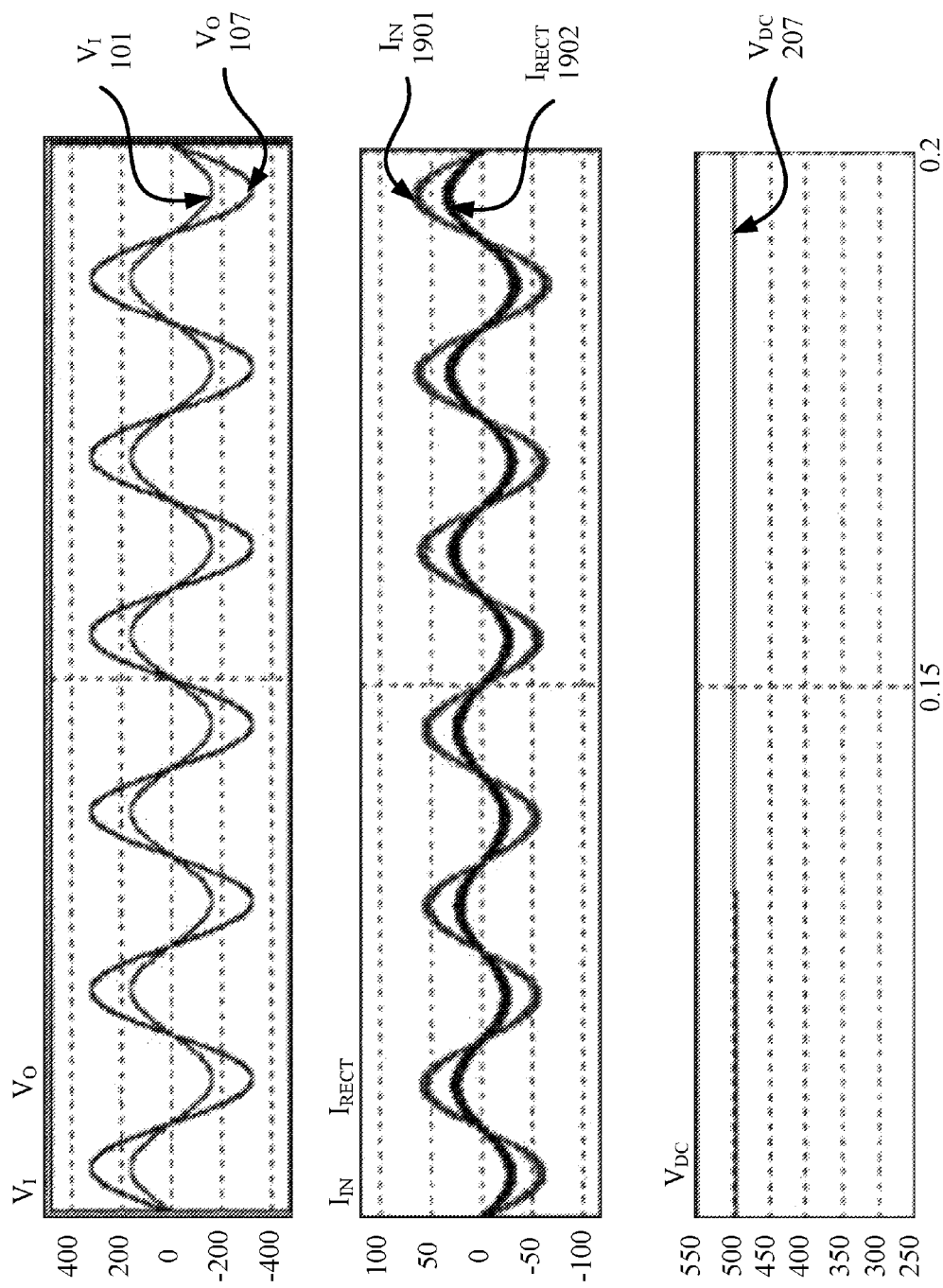
FIG. 11 illustrates a simulation result in boost mode, 50% AC input, regenerative load for an active rectifier front end on a transformerless series regulator circuit according to embodiments of the present inventions.

FIG. 11 illustrates simulation results in boost mode, 50% AC input with regenerative load. Upper plot shows input and output voltage, middle plot shows input current and rectifier current, bottom plot shows regulated DC bus. Note currents are now 180 deg out of phase with input voltage.

Figure 12:
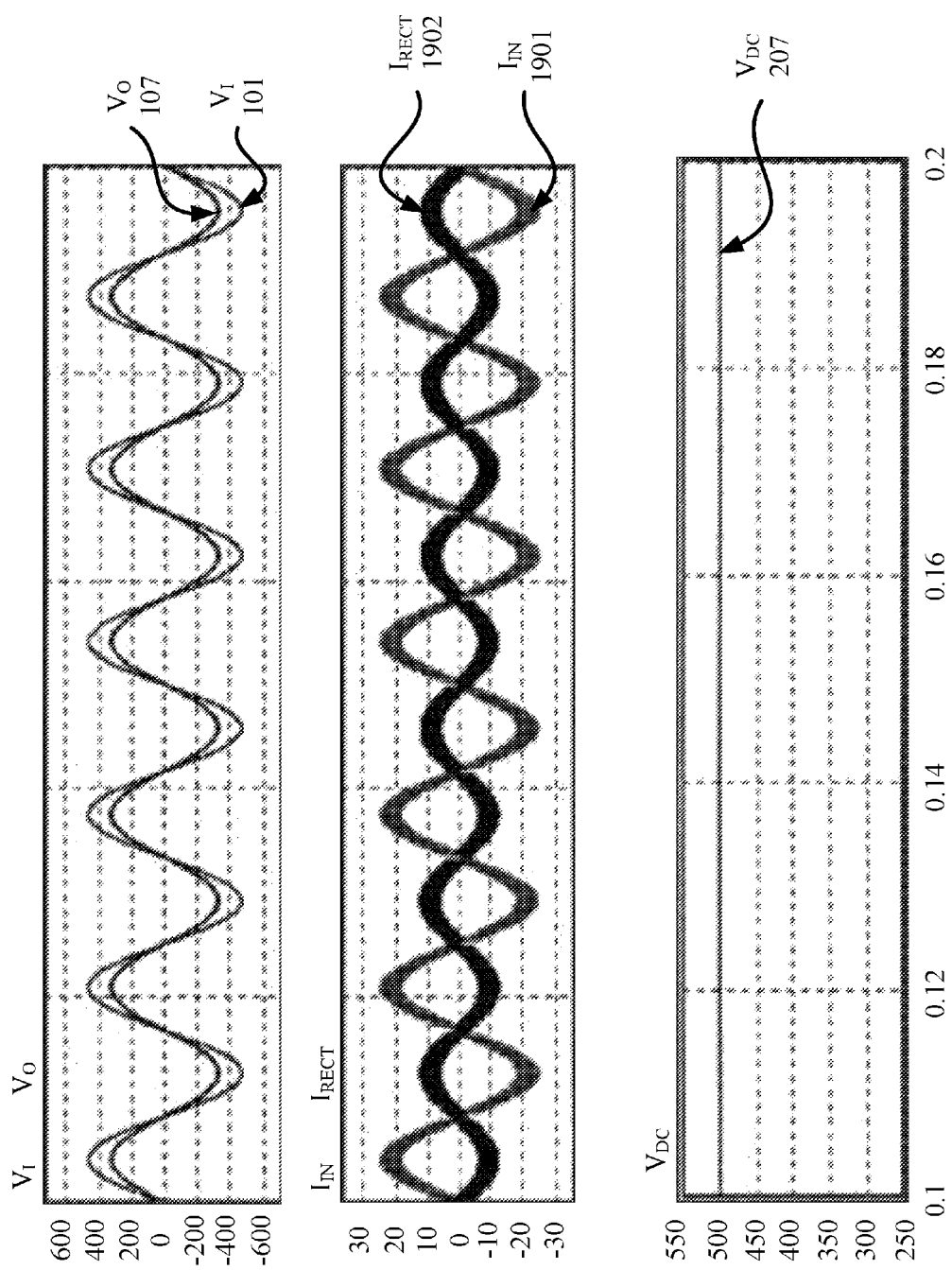
FIG. 12 illustrates a simulation result in buck mode with 143% AC input with resistive load for an active rectifier front end on a transformerless series regulator circuit according to embodiments of the present inventions.

FIG. 12 illustrates simulation results in buck mode, 143% AC input with resistive load. Upper plot shows input and output voltage, middle plot shows input current and rectifier current, bottom plot shows regulated DC bus. Note rectifier current shows power being regenerated due to bucking.

Figure 13:
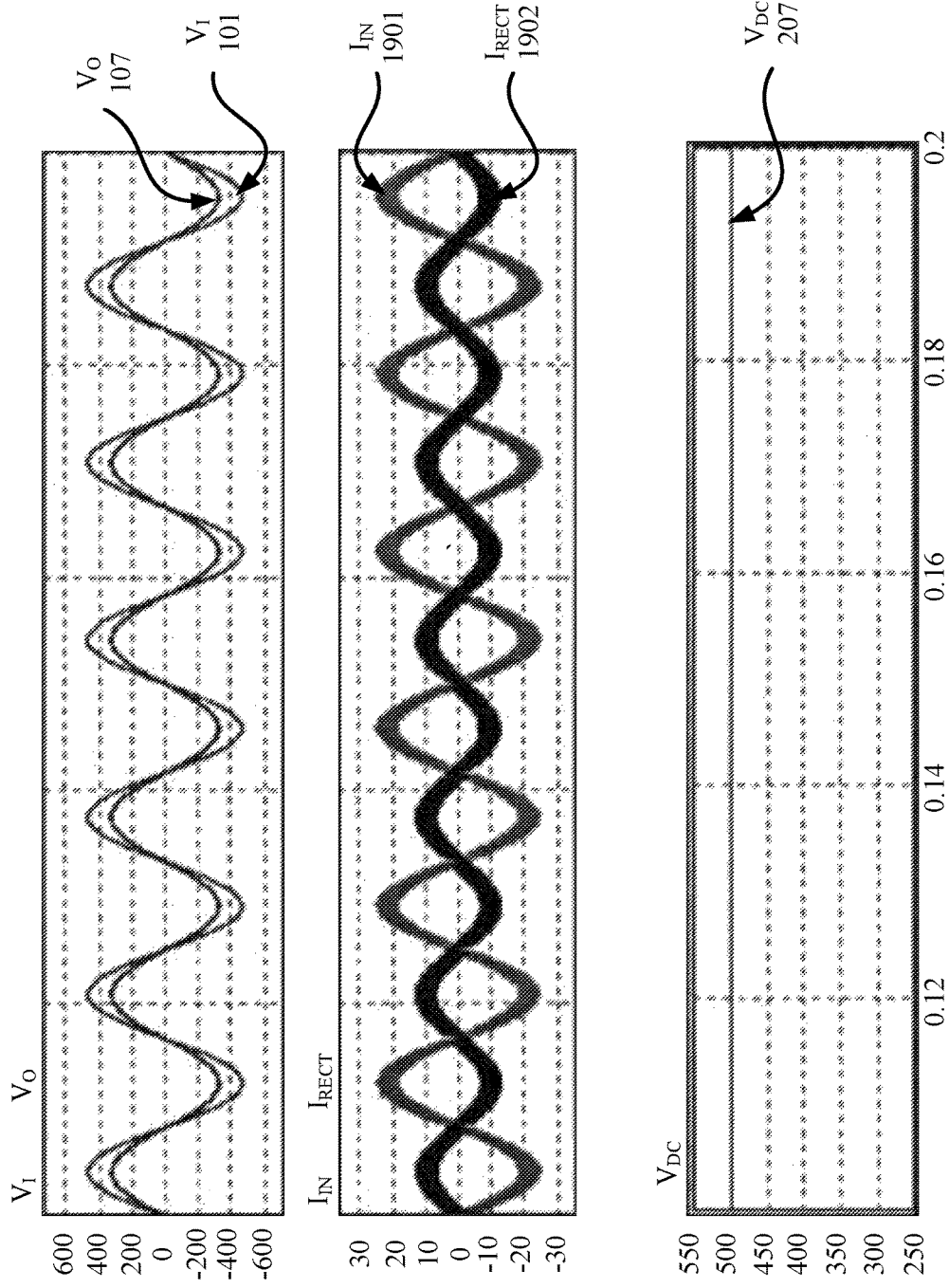
FIG. 13 illustrates a simulation result in buck mode with 143% AC input with regenerative load for an active rectifier front end on a transformerless series regulator circuit according to embodiments of the present inventions.

FIG. 13 illustrates simulation results in buck mode, 143% AC input with regenerative load. Upper plot shows input and output voltage, middle plot shows input current and rectifier current, bottom plot shows regulated DC bus. Note rectifier current shows power being delivered to DC bus due to bucking.

Figure 14:
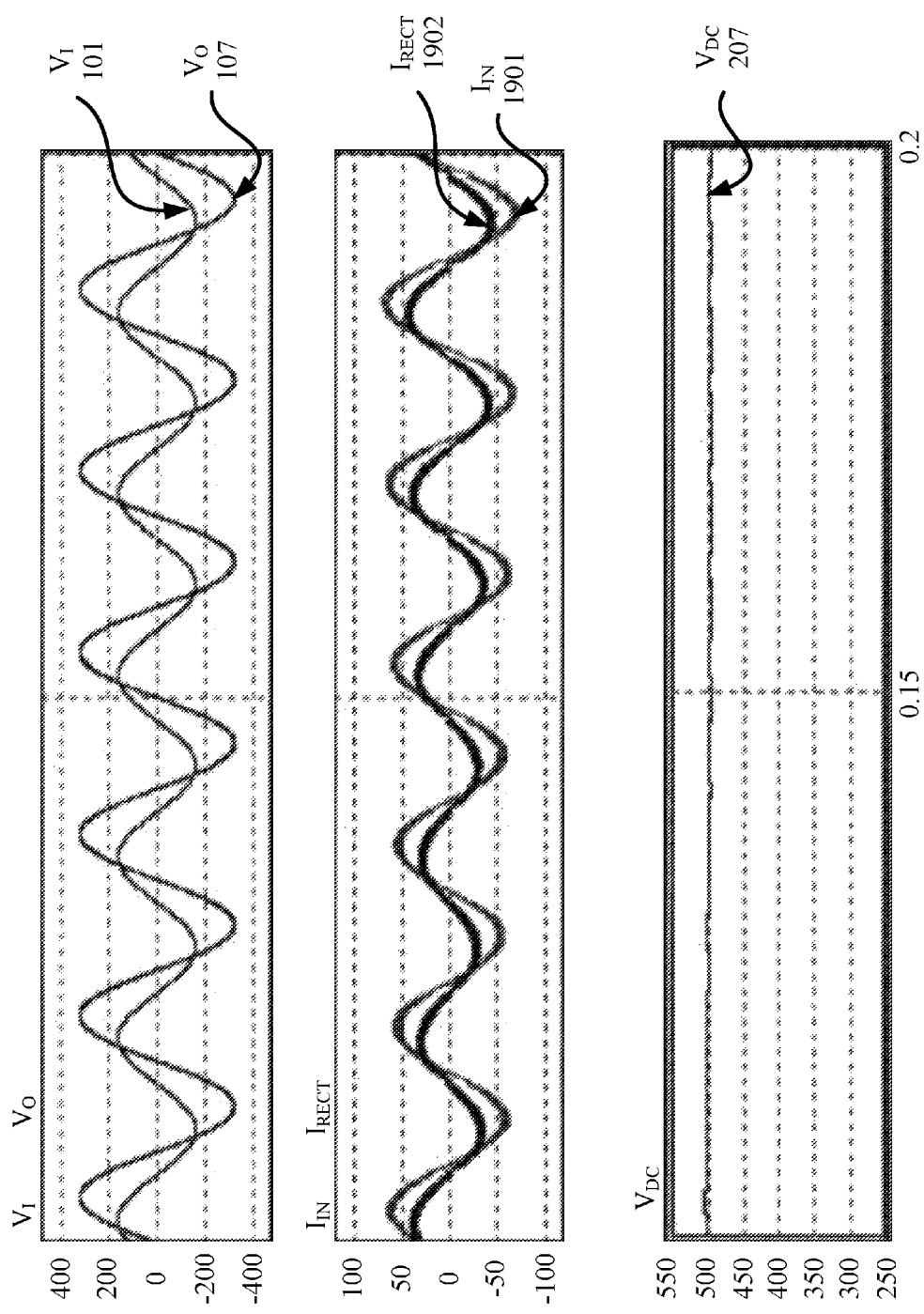
FIG. 14 illustrates a simulation result in an average boost mode with 50% AC input, 45 degree phase shift and resistive load for an active rectifier front end on a transformerless series regulator circuit according to embodiments of the present inventions.

FIG. 14 illustrates simulation results for a 50% AC input phase shifted 45 degrees ahead of the output with a resistive load. The control switches between buck and boost modes every cycle because of the phase shift even though on average, the system is boosting the input voltage. Upper plot shows input and output voltage, middle plot shows input current and rectifier current, bottom plot shows regulated DC bus. Note rectifier current is in phase with input.

Figure 15:
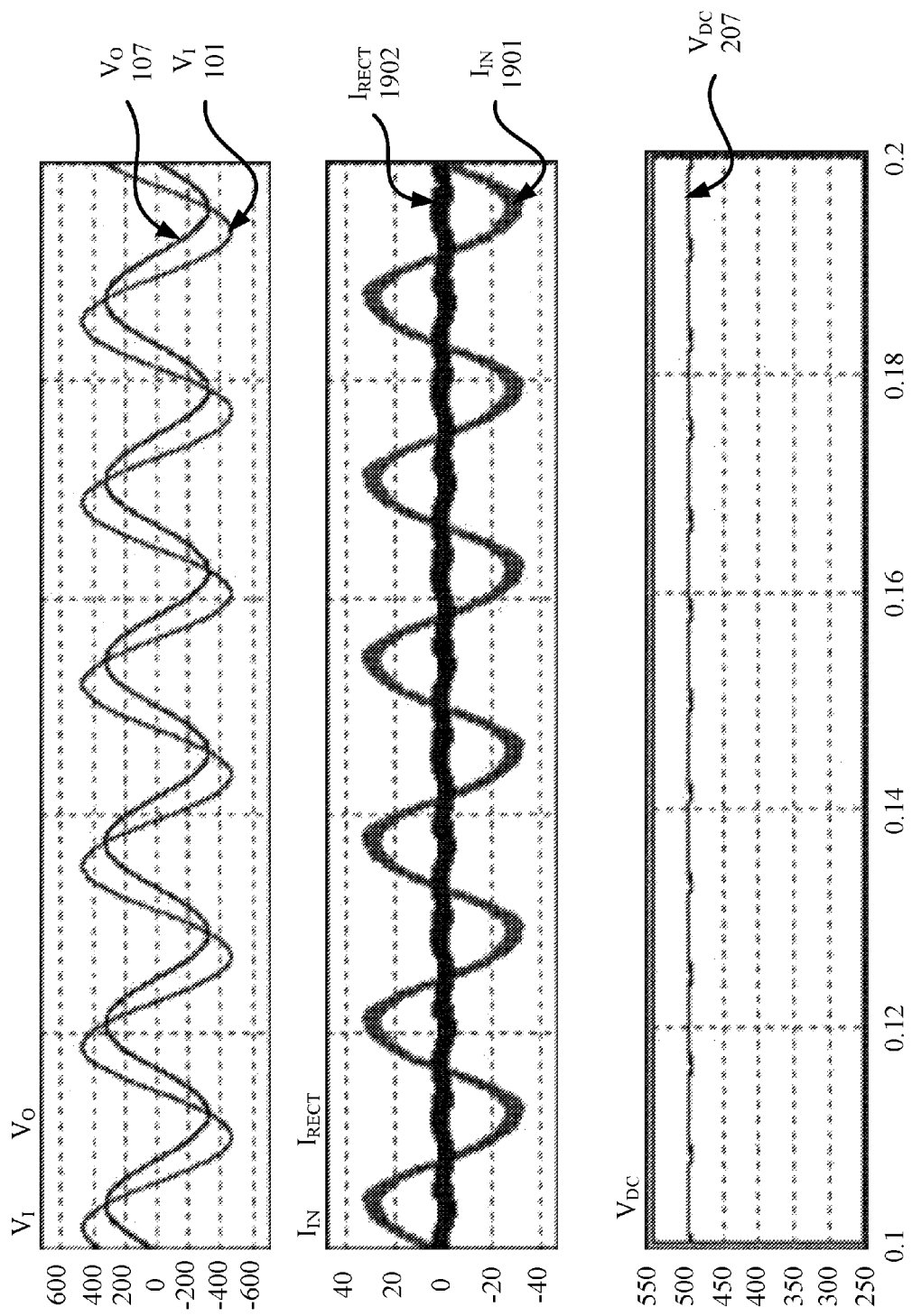
FIG. 15 illustrates a simulation result in an average buck mode with 143% AC input, 45 degree phase shift and resistive load for an active rectifier front end on a transformerless series regulator circuit according to embodiments of the present inventions.

FIG. 15 illustrates simulation results for a 143% AC input phase shifted 45 degrees ahead of the output with a resistive load. The control switches between buck and boost modes every cycle because of the phase shift even though on average, the system is bucking the input voltage. Upper plot shows input and output voltage, middle plot shows input current and rectifier current, bottom plot shows regulated DC bus. Note rectifier current is almost zero because energy from bucking is balanced by energy needed to shift the phase by 45 degrees.

Figure 16:
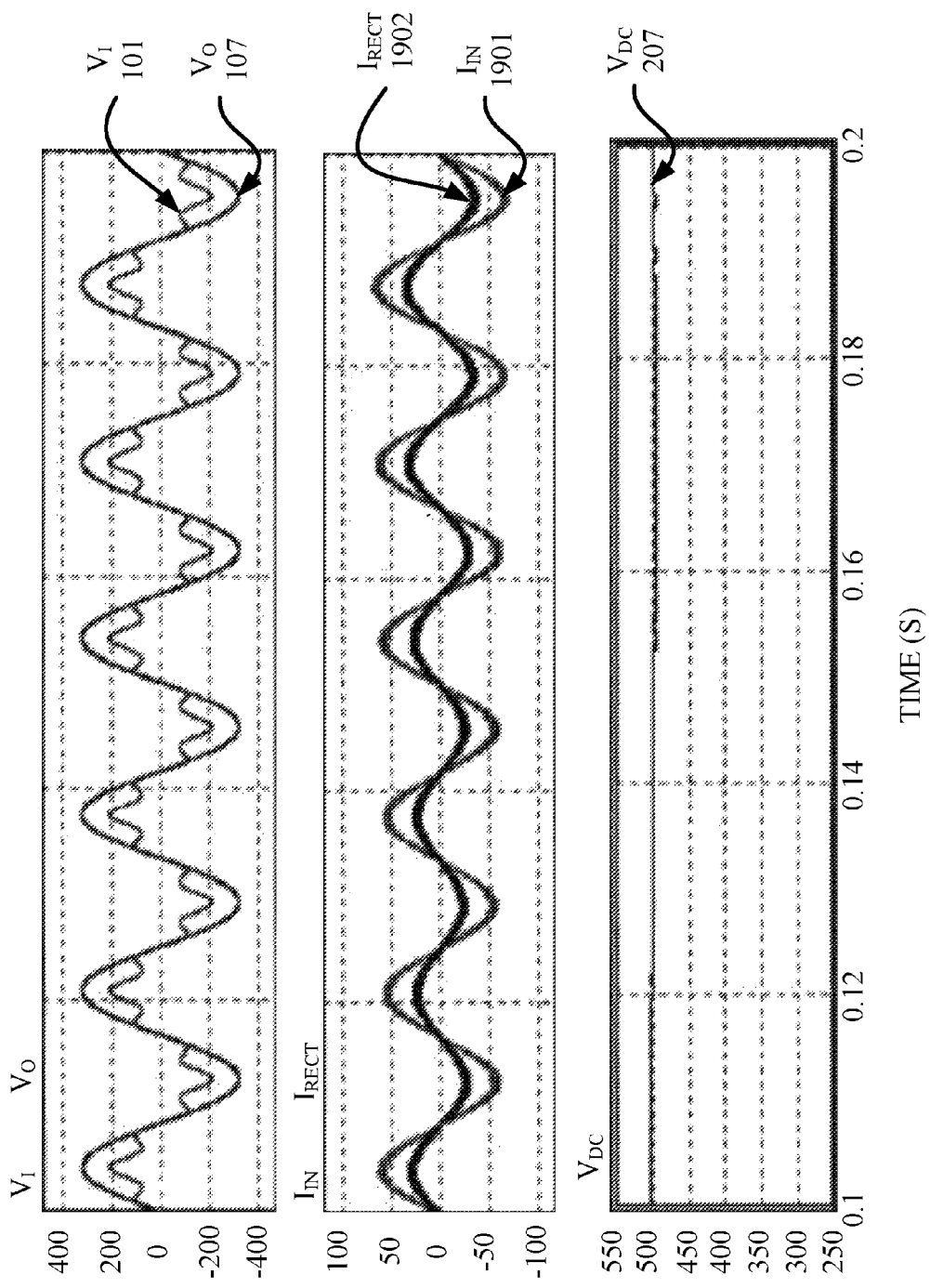
FIG. 16 illustrates a simulation result in boost mode with 50% AC input, distorted with harmonics and resistive load for an active rectifier front end on a transformerless series regulator circuit according to embodiments of the present inventions.

FIG. 16 illustrates Simulation results, boost mode, 50% AC input voltage, distorted with harmonics and a resistive load. Upper plot shows input and output voltage, middle plot shows input current and rectifier current, bottom plot shows regulated DC bus. Note currents and output voltage are free of harmonics.

Figure 17:
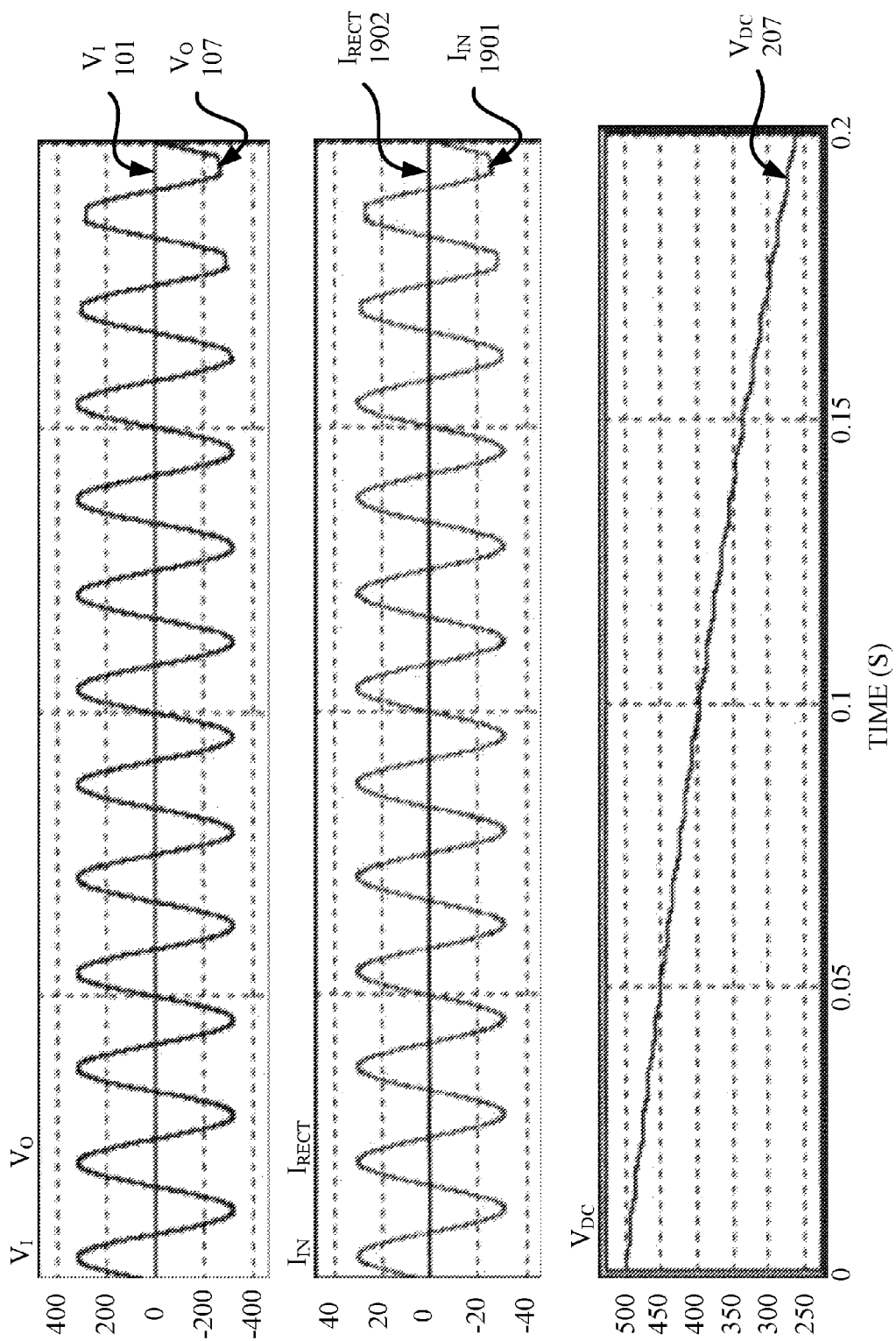
FIG. 17 illustrates a simulation of zero voltage ride through for an active rectifier front end on a transformerless series regulator circuit according to embodiments of the present inventions.

FIG. 17 illustrates simulation results for the embodiment illustrated in FIG. 9 in boost mode for 0% AC input with 3.5 kW resistive load. The results for a similar set of operating conditions is illustrated in FIG. 6 for the embodiment of FIG. 2. There is a significant difference in the results illustrated in FIG. 17 from the results illustrated in FIG. 6. For the same DC holding source capacitance $C_{DC}$ 206, the stored energy is greater resulting in the AC output voltage being sustained for a much longer time. This is possible because of the higher initial voltage $V_{DC}$ 207 on capacitor $C_{DC}$ due to the boost charging capability of the active rectifier 1101. Upper plot shows input and output voltage, middle plot shows input current and rectifier current, bottom plot shows regulated DC bus. Note DC bus voltage discharges to about 50% which extracts 75% of capacitor stored energy.

FIG. 17 illustrates a schematic diagram of the system according to a fifth embodiment of the present inventions that implements an energy storage converter option. An additional two semiconductor switches $S_7$ 217, $S_8$ 218 may be added to the circuit to provide DC/DC power conversion from an energy storage device such as an electrolytic capacitor, double-layer ultra-capacitor or battery. $S_7$-$S_8$ may be controlled to charge or discharge the energy storage component $C_4$ 1105. Control of $S_7$-$S_8$ is completely independent of the modulation of the other switches. The DC storage component $C_4$ must operate at a lower voltage than the DC bus in this configuration. An alternate DC/DC buck converter may be used if the DC storage component voltage is higher than the DC bus but this would not be preferred.

FIG. 18 illustrates a schematic diagram of the system according to a fifth embodiment of the present inventions. The AC source 101 ($V_I$) line LINE and common COM outputs as illustrated in FIG. 18. FIG. 18 illustrates a voltage regulator with addition of energy storage converter components $S_7$ 217, $S_8$ 218, $L_3$ 1502 and $C_4$ 1105. $C_4$ may be an electrolytic capacitor, ultra-capacitor, battery or any other DC storage device.

FIG. 18 illustrates AC Source $V_I$ 101 is connected to common at the bottom side and the top side is connected to one side of $L_I$ 202. Eight Switches are mutually connected to each other in horizontal & vertical modes which are then divided within the vertical sections. First vertical section includes switches $S_1$ 211 & $S_2$ 212, second vertical section includes Switches $S_3$ 213 & $S_4$ 214, and third vertical section includes capacitor $C_{DC}$ 206 with $V_{DC}$ 207. The fourth vertical section includes switches $S_7$ 217 & $S_8$ 218. A fifth vertical section includes switches $S_5$ 215 & $S_6$ 216". Input Inductor $L_I$ 203 is connected to common at bottom side and the top side is connected between Switches $S_5$ 215 & $S_6$ 216. The left side of inductor $L_3$ 1502 is connected to the top of capacitor $C_4$ 1105 with $V_{ES}$ 1501. The right side of the inductor 1502 is connected between switches $S_7$ 217 & $S_8$ 218. The bottom of capacitor $C_4$ 1105 is connected to the bottom of switch $S_8$ 218. Output inductor $L_O$ 219 is connected between two switches $S_1$ 211 and $S_2$ 212 and the other side is connected to the top of capacitor $C_2$ 1103 and Load 108 (where output voltage $V_O$ 107 is produced). The bottom of capacitor $C_2$ 1103 is connected to switches $S_3$ 213 and $S_4$ 214. Current $I(S_1)$ 221 & $I(S_2)$ 222 are flowing in the direction of switch $S_2$ 212 from switch $S_1$ 211. Also Current $I(S_3)$ 223 & $I(S_4)$ 224 are flowing in the direction of switch $S_4$ 214 from switch $S_3$ 213.

FIG. 18 illustrates a schematic diagram of the system with an active rectifier 1101 in the position of the common half-bridge switch according to a fifth embodiment of the present invention. The system of FIG. 18 is capable of forward and reverse power flow and AC boost and buck operation. AC Source $V_I$ 101 is connected with switches $S_3$ 213 and $S_4$ 214 to the DC holding source $C_{DC}$ 206 (at a voltage of $V_{DC}$ 207) and an active rectifier half-bridge 1101 comprised of switches $S_5$ 215 & $S_6$ 216 is also connected to $C_{DC}$ according to the fifth preferred embodiment.

An input half-bridge switch $S_3$ 213 and $S_4$ 214 is operatively coupled to the DC power holding source 206 and operates at a first switching frequency in boost mode and at AC line frequency in buck mode. An output half-bridge switch $S_1$ 211 and $S_2$ 212 is operatively coupled to the DC power holding source 206 and operates at AC line frequency in boost mode and a first switching frequency in buck mode. A common half-bridge switch 215, 216 is operatively coupled to the DC holding source 206 and operates at a second switching frequency in boost and buck mode.

In the fifth embodiment of FIG. 18, a common half-bridge switch comprises a pair of switches $S_5$ 215 & $S_6$ 216 in parallel with the input half-bridge switch $S_3$ 213, $S_4$ 214, the output half-bridge switch $S_1$ 211, $S_2$ 212, the energy storage converter half-bridge $S_7$ 217 & $S_8$ 218, and the DC power holding source 206.

An input low pass filter $L_I$ 203, $C_3$ 1104 is operatively coupled to the common half-bridge switch 215, 216 and the input half-bridge switch 213, 214 and has filter characteristics to eliminate the first switching frequency energy and the second switching frequency energy from entering the AC source 101. An input terminal 109 is operatively coupled from the input low pass filter 111 to the AC source 101.

An output low pass filter $L_O$ 219, $C_2$ 1103 is operatively coupled to the output half-bridge switch 211, 212 and input half-bridge 213, 214 and has filter characteristics to eliminate the first switching frequency energy and the second switching frequency from entering the AC load 108. An output terminal 110 is operatively coupled from the output low pass filter 112 to the AC load 108.

An energy storage converter low pass filter $L_3$ 1502 is operatively coupled to the energy storage converter half-bridge switch 217, 218 and energy storage element $C_4$ 1105 and has filter characteristics to eliminate a third switching frequency energy from entering the energy storage element $C_4$ 1105. Note that $C_4$ is a composite that includes at least a filter capacitor and an energy storage element such as an electrolytic capacitor, double-layer capacitor or battery.

In the fifth embodiment of FIG. 18, the controller 102 generates four control signals: an input half-bridge switch control signal operatively coupled to switch the input half-bridge switch 213, 214, an output half-bridge switch control signal operatively coupled to switch the output half-bridge switch 211, 212, a common half-bridge switch control signal operatively coupled to switch the common half-bridge switch 215, 216 and an energy storage converter half-bridge switch control signal operatively coupled to switch the energy storage converter switch 217, 218.

The signal processing techniques disclosed herein with reference to the accompanying drawings can be implemented on one or more digital signal processors (DSPs) or other microprocessors. Nevertheless, such techniques could instead be implemented wholly or partially as hardwired circuits. Further, it is appreciated by those of skill in the art that certain well known digital processing techniques are mathematically equivalent to one another and can be represented in different ways depending on choice of implementation.

Any letter designations such as (a) or (b) or (1) or (2) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. An AC power converter for power converting from an AC power source to an AC load, the AC power converter comprising:
   an input terminal from the AC power source at a line frequency;
   an input low pass filter operatively coupled to the input terminal and having filter characteristics to eliminate switching frequency energy from entering the AC power source;
   an input half-bridge switch operatively coupled to the input low pass filter and operating at one of a first switching frequency and the line frequency;
   a common half-bridge switch operatively coupled to the input low pass filter and operating at a second switching frequency;
   a DC voltage source utilizing a capacitor and operatively coupled to the input half-bridge switch and the common half-bridge switch;
   an output half-bridge switch operatively coupled to the DC voltage source and operating at another one of the first switching frequency and the line frequency;
   a controller operatively coupled to the input half-bridge switch, the common half-bridge switch, and the an output half-bridge switch, wherein the input half bridge is switched at the first switching frequency in boost mode and at the line frequency in buck mode, and wherein the output half bridge switch is switched at the first switching frequency in buck mode and at the line frequency in boost mode, wherein the controller switches the common half-bridge switch to regulate a constant voltage at the DC voltage source and switches the input half-bridge switch and the output half-bridge switch to regulate an output voltage to the AC load, wherein the controller generates at least the first switching frequency and the second switching frequency sufficient to regulate a voltage at the DC voltage source above a peak voltage of the AC power source and below twice the peak voltage of the AC power source;
   an output low pass filter operatively coupled to the output half-bridge switch and having filter characteristics to eliminate switching energy of the first switching frequency and the second switching frequency from entering the AC load; and
   an output terminal operatively coupled from the output low pass filter to the AC load.

2. An AC power converter according to claim 1, wherein the controller generates at least the first switching frequency and the second switching frequency sufficient to regulate a voltage at the DC voltage source above a peak voltage of the AC power source and below 120% times the peak voltage of the AC power source.

3. An AC power converter according to claim 1, wherein the controller generates at least the first switching frequency and the second switching frequency each with duty cycles chosen to regulate the voltage at the DC voltage source above a peak voltage of the AC power source and below twice the peak voltage of the AC power source.

4. An AC power converter according to claim 1, wherein the DC voltage source comprises a super capacitor or a battery.

5. An AC power converter according to claim 1, wherein the DC voltage source utilizing the capacitor has an energy storage capacity sufficient to maintain a voltage of the DC voltage source over a plurality of periods at the line frequency of the AC power source when an AC power source voltage at the input terminal is less than half an AC load voltage at the output terminal.

6. A method of AC power conversion, the method comprising the steps of:
   (a) providing an AC power converter for power converting from an AC power source to an AC load, AC power converter comprising:
      a. an input terminal from the AC power source at a line frequency;
      b. an input low pass filter operatively coupled to the input terminal and having filter characteristics to eliminate switching frequency energy from entering the AC power source;
      c. an input half-bridge switch operatively coupled to the input low pass filter and operating at one of a first switching frequency and the line frequency;
      d. a common half-bridge switch operatively coupled to the input low pass filter and operating at a second switching frequency;

e. a DC voltage source utilizing a capacitor and operatively coupled to the input half-bridge switch and the common half-bridge switch;
f. an output half-bridge switch operatively coupled to the DC voltage source and operating at another one of the first switching frequency and the line frequency;
g. a controller operatively coupled to at least two of the input half-bridge switch, the common half-bridge switch, and the output half-bridge switch;
h. an output low pass filter operatively coupled to the output half-bridge switch and having filter characteristics to eliminate switching energy of the first switching frequency and the second switching frequency from entering the AC load; and
i. an output terminal operatively coupled from the output low pass filter to the AC load;

(b) switching the input half bridge at the first switching frequency in buck mode and at the line frequency in boost mode;
(c) switching the output half bridge switch at the first switching frequency in boost mode and at the line frequency in buck mode;
(d) switching the common half-bridge switch to regulate a constant voltage at the DC voltage source;
(e) switching the input half-bridge switch and the output half-bridge switch to regulate an output voltage to the AC load; and
(f) generating at least the first switching frequency and the second switching frequency sufficient to regulate a voltage at the DC voltage source above a peak voltage of the AC power source and below twice the peak voltage of the AC power source.

7. A method of AC power conversion according to claim 6, wherein said steps (b) and (c) of switching comprise the substep of switching at least the first switching frequency and the second switching frequency with a switching action sufficient to regulate a voltage at the DC voltage source above a peak voltage of the AC power source and below 120% times the peak voltage of the AC power source.

8. A method of AC power conversion according to claim 6, wherein said steps (b) and (c) of switching comprise the substep of switching at least the first switching frequency and the second switching frequency with duty cycles chosen to cause the voltage at the DC voltage source above a peak voltage of the AC power source and below twice the peak voltage of the AC power source.

9. A method of AC power conversion according to claim 6, wherein the DC voltage source utilizing the capacitor provided in said step (a) has an energy storage capacity sufficient to maintain a voltage of the DC voltage source over a plurality of periods at the line frequency of the AC power source when an AC power source voltage at the input terminal is less than half an AC load voltage at the output terminal.

10. An AC power converter for power converting from an AC power source to an AC load, the AC power converter comprising:
an input terminal from the AC power source at a line frequency;
an input low pass filter operatively coupled to the input terminal and having filter characteristics to eliminate switching frequency energy from entering the AC power source;
an input half-bridge switch operatively coupled to the input low pass filter and operating at one of a first switching frequency and the line frequency;
a common half-bridge switch operatively coupled to the input low pass filter and operating at the line frequency, wherein the common half-bridge switch comprises a pair of diodes in parallel with the input half-bridge switch and the output half-bridge switch;
a DC voltage source utilizing a capacitor and operatively coupled to the input half-bridge switch and the common half-bridge switch;
an output half-bridge switch operatively coupled to the DC voltage source and operating at another one of the first switching frequency and the line frequency;
a controller operatively coupled to the input half-bridge switch and an output half-bridge switch, wherein the input half bridge is switched at the first switching frequency in boost mode and at the line frequency in buck mode, and wherein the output half bridge switch is switched at the first switching frequency in buck mode and at the line frequency in boost mode to regulate an output voltage to the AC load to maintain a voltage at the DC voltage source at the peak voltage of the AC power source, wherein the controller generates the first switching frequency sufficient to cause the switching of the pair of the diodes at the line switching frequency;
an output low pass filter operatively coupled to the output half-bridge switch and having filter characteristics to eliminate switching energy of the first switching frequency and the second switching frequency from entering the AC load; and
an output terminal operatively coupled from the output low pass filter to the AC load.

11. An AC power converter according to claim 10, wherein the controller generates the first switching frequency with a duty cycle chosen to cause the switching of the pair of the diodes at the line switching frequency.

12. An AC power converter according to claim 11, wherein the pair of the diodes comprise a pair of silicon controlled rectifiers.

13. An AC power converter according to claim 12, wherein the controller is operatively coupled to the pair of silicon controlled rectifiers to remove a gate signal and open at least one of the silicon controlled rectifiers upon an overcurrent condition.

14. An AC power converter according to claim 10, wherein the DC voltage source comprises a super capacitor or a battery.

15. An AC power converter according to claim 10, wherein the DC voltage source utilizing the capacitor has an energy storage capacity sufficient to maintain a voltage of the DC voltage source over a plurality of periods at the line frequency of the AC power source when an AC power source voltage at the input terminal is less than half an AC load voltage at the output terminal.

* * * * *